United States Patent [19]

Angenieux

[11] 4,270,848

[45] Jun. 2, 1981

[54] IMAGE ENLARGING OPTICAL VARIATOR

[76] Inventor: Pierre Angenieux, 31, chemin des Hauts Crets, Geneva, Switzerland

[21] Appl. No.: 952,061

[22] Filed: Oct. 17, 1978

Related U.S. Application Data

[63] Continuation-in-part of Ser. No. 856,084, Nov. 30, 1977, abandoned, which is a continuation-in-part of Ser. No. 730,712, Oct. 8, 1976, abandoned.

[30] Foreign Application Priority Data

Nov. 21, 1975 [FR] France .................. 75 35613

[51] Int. Cl.³ .............................. G02B 15/18
[52] U.S. Cl. ...................................... 350/427
[58] Field of Search ............................ 350/184

[56] References Cited

U.S. PATENT DOCUMENTS

| 3,507,555 | 4/1970 | Isshiki | 350/184 |
| 3,609,005 | 9/1971 | Nakamura | 350/184 |
| 3,884,555 | 5/1975 | Suwa et al. | 350/184 X |

FOREIGN PATENT DOCUMENTS

| 1366943 | 6/1964 | France | 350/184 |
| 943180 | 12/1963 | United Kingdom | 350/184 |
| 975160 | 11/1964 | United Kingdom | 350/184 |
| 1025899 | 4/1966 | United Kingdom . | |

Primary Examiner—John K. Corbin
Assistant Examiner—Scott J. Sugarman
Attorney, Agent, or Firm—Michael J. Striker

[57] ABSTRACT

This optical image enlarging variator comprises two coaxial components adapted to give from a fixed virtual image located at the rear of the front component, a fixed real image, located at the rear of the rear component; the magnification varies as a function of the relative position of the two components movable in relation to each other and to the fixed position of the diaphragm; the front component is divergent, comprises four lenses and the rear component also comprises four lenses; in one of their relative positions, $g1=g2==G=1$, and irrespective of the relative positions of these components the following requirements: $0.20 < g1 < 1.60$ and $0.25 < g2 < 1.50$ are met, as well as condition $f2/f1 > 1.2$, wherein g1 is the image magnification produced by the front component, g2 the image magnification produced by the rear component, and G the image magnification produced by the complete device, f1 being in absolute value the focal length of the front component and f2 the focal length of the rear component.

27 Claims, 15 Drawing Figures

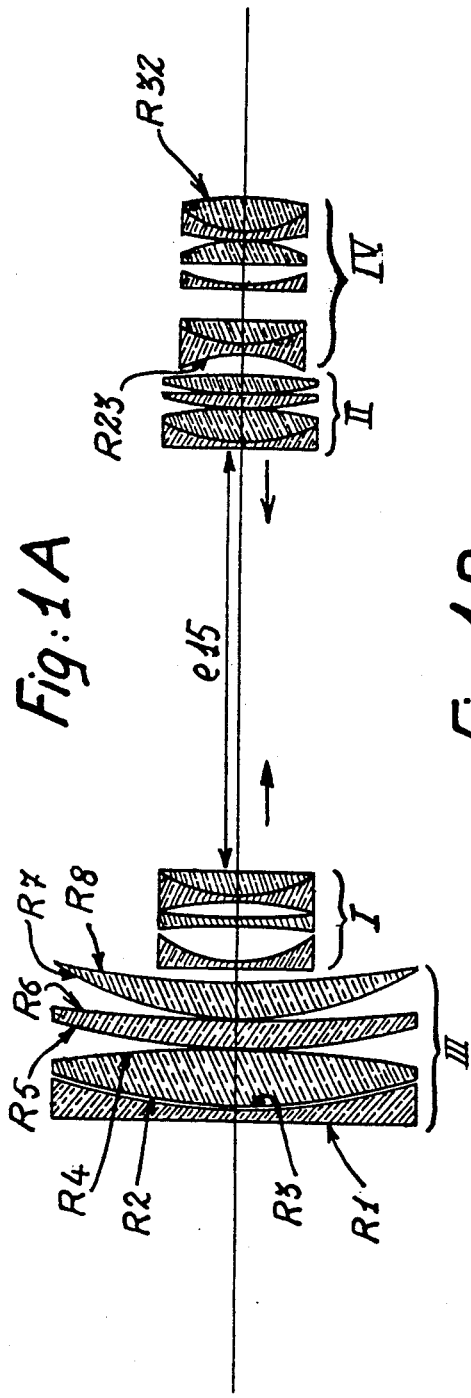
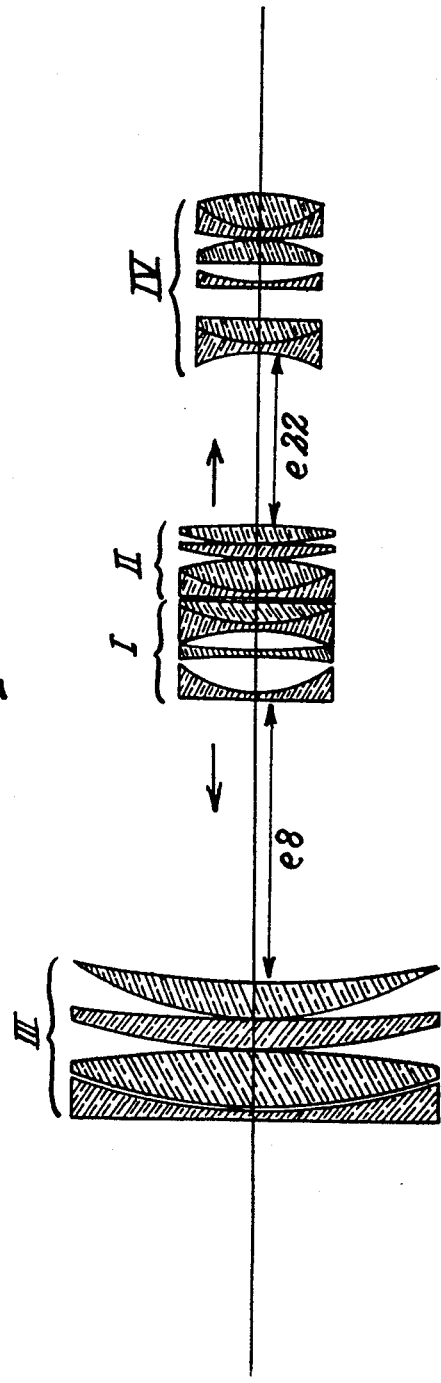

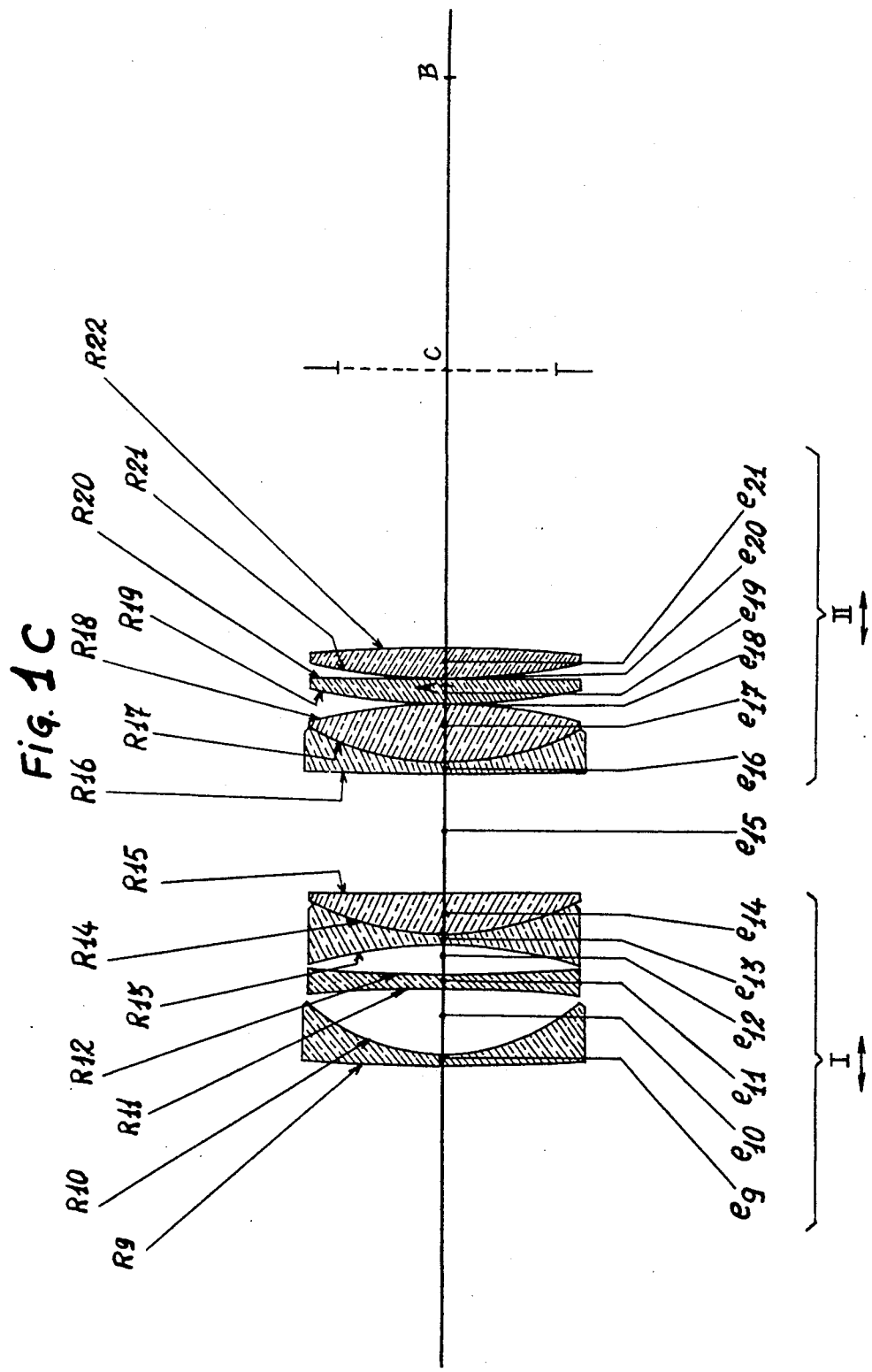

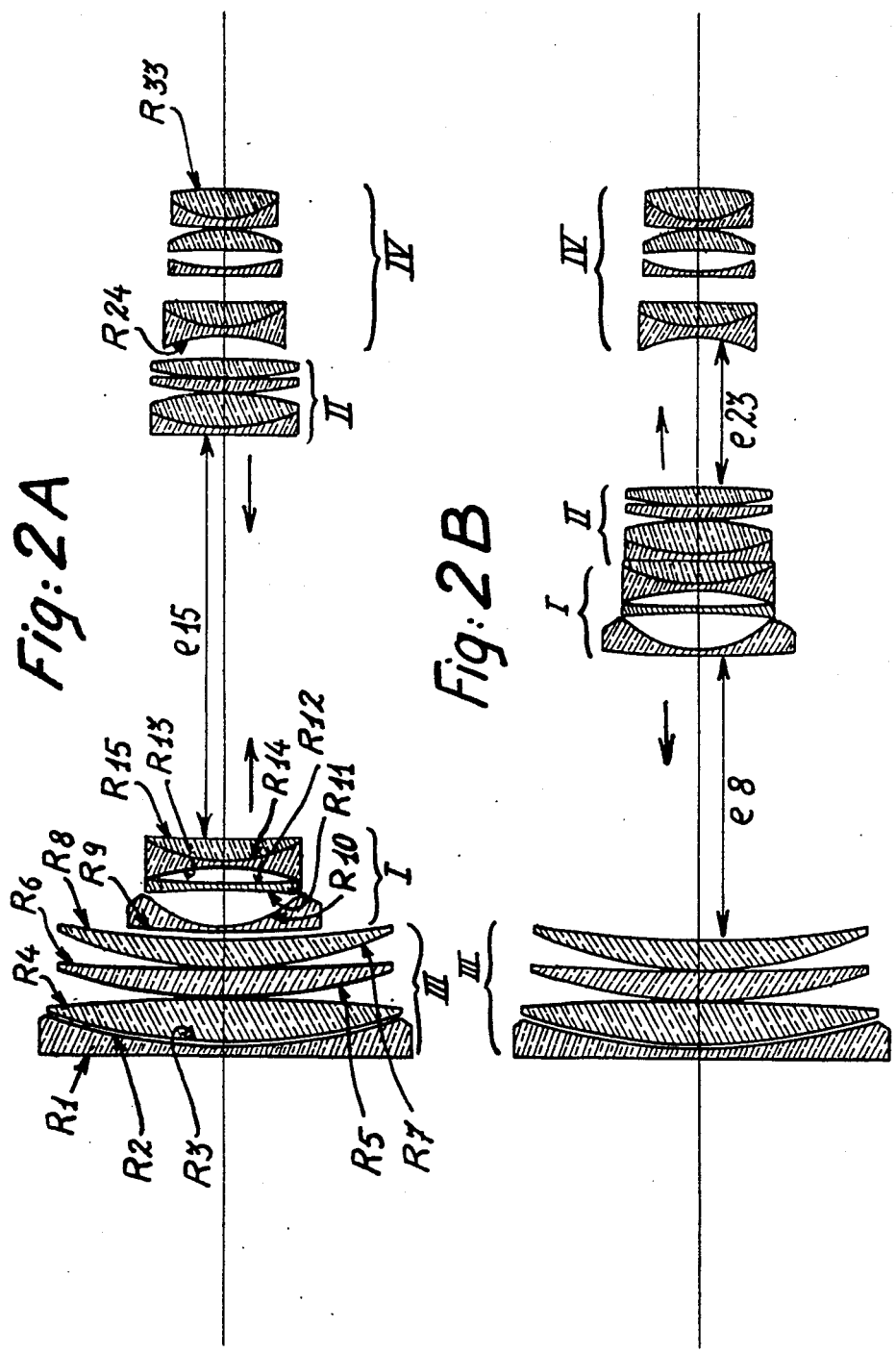

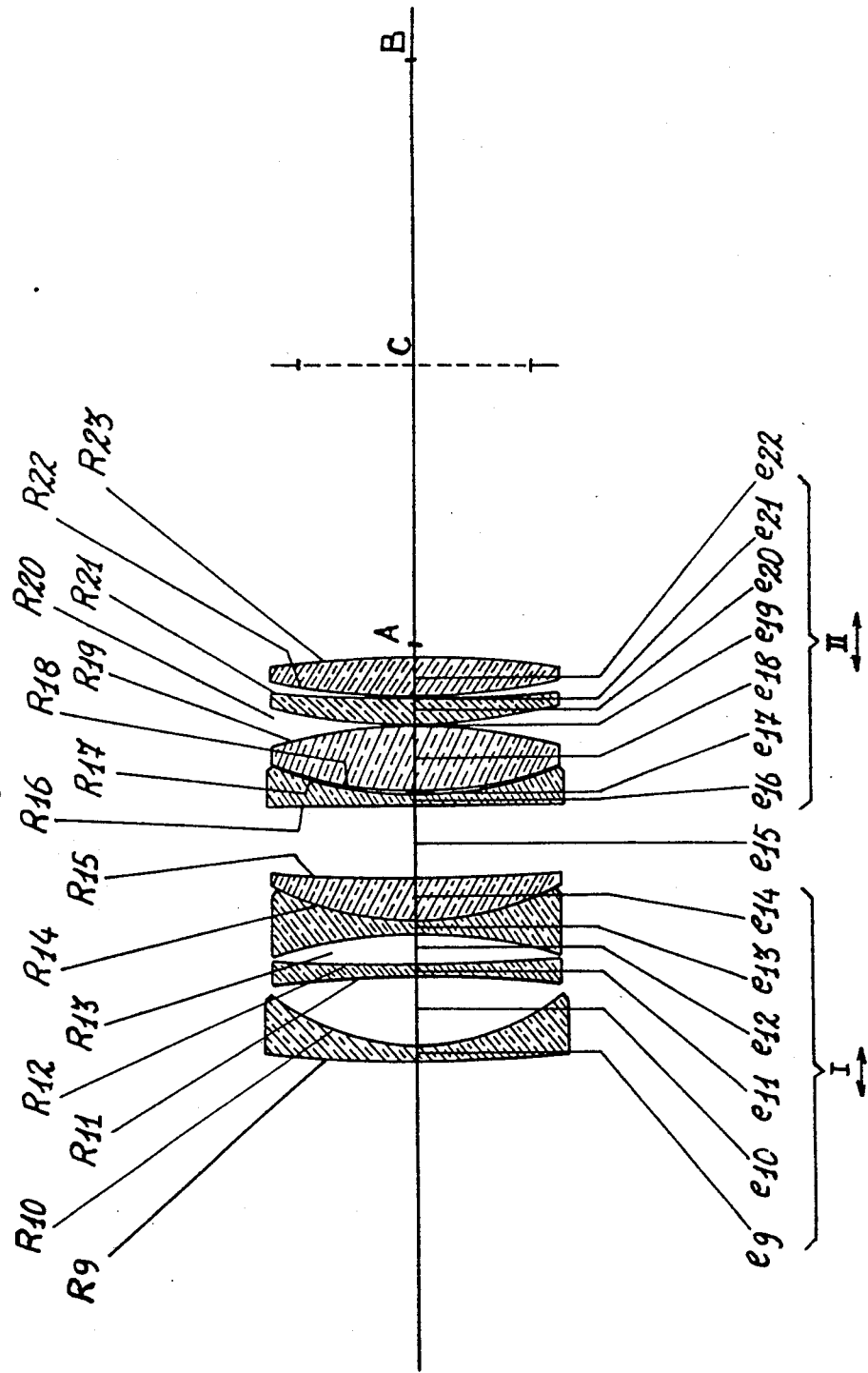

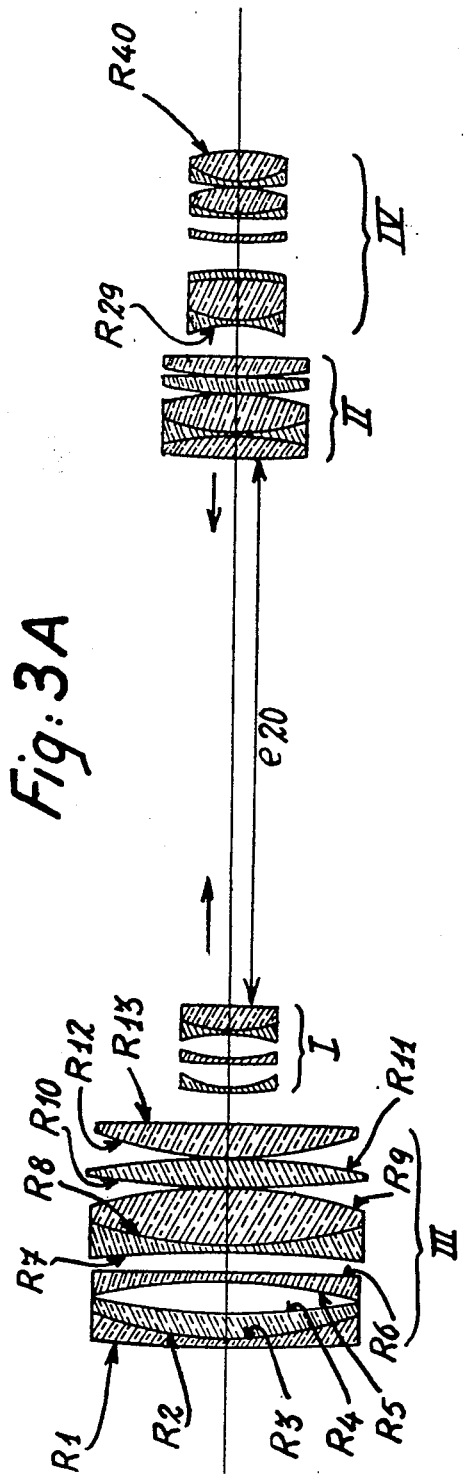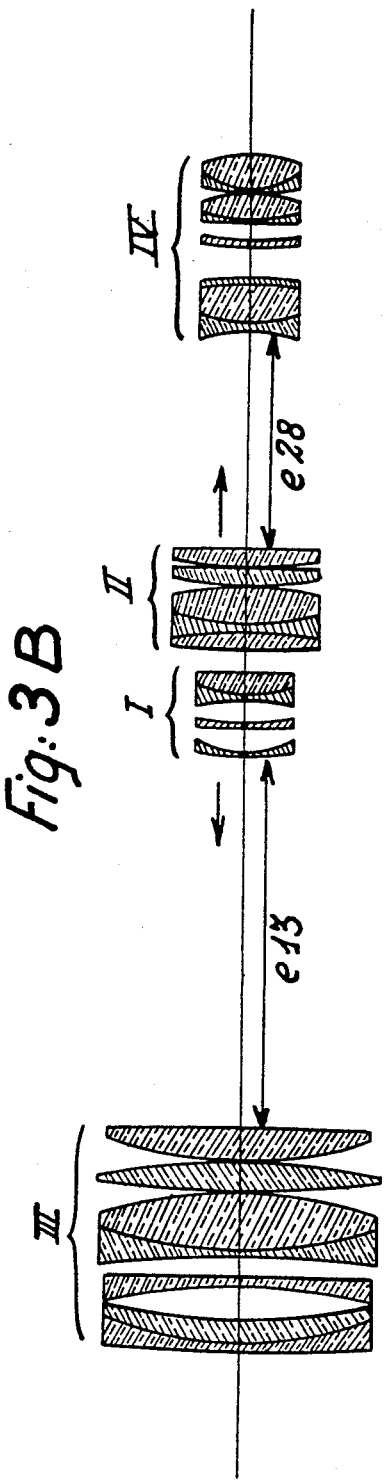

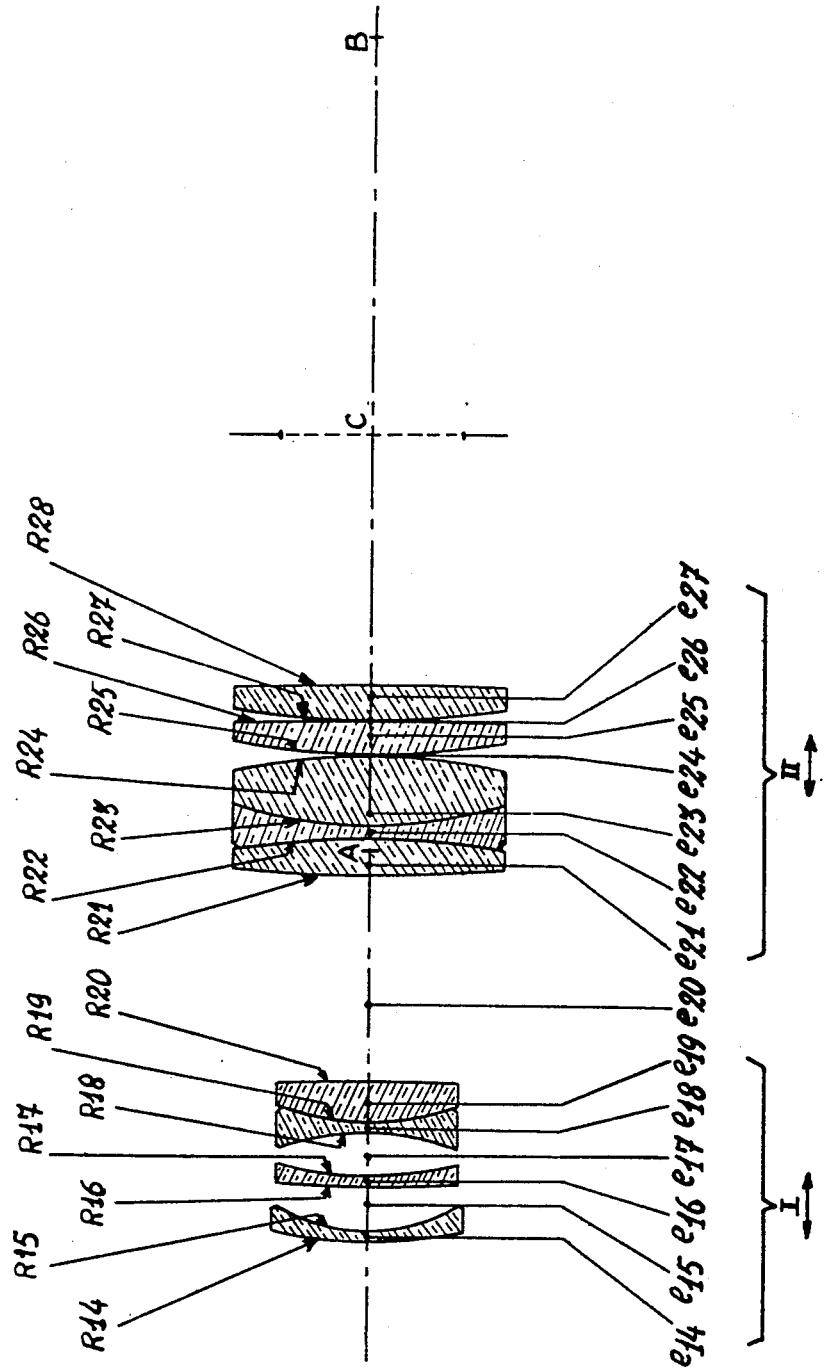

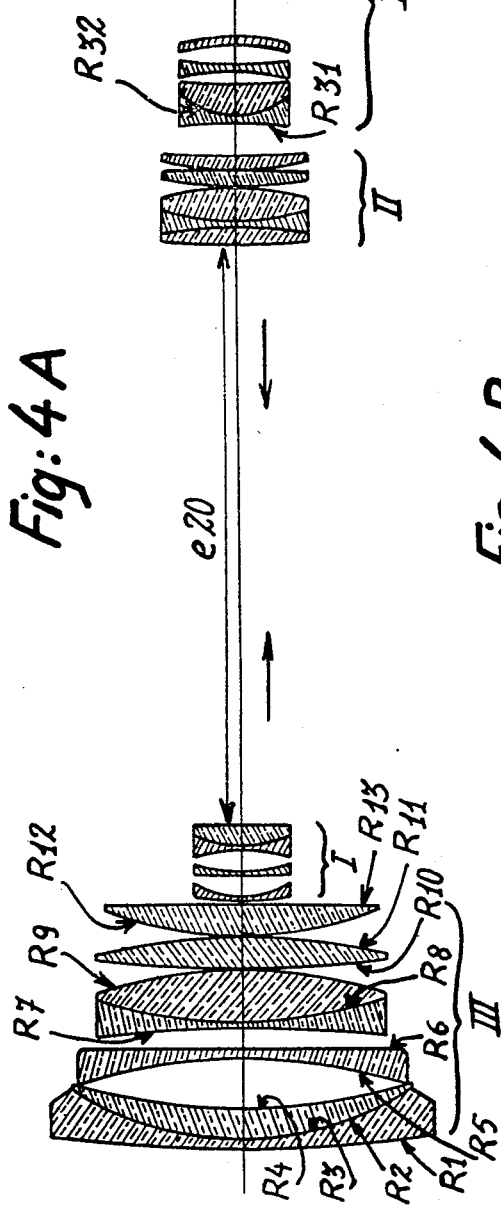
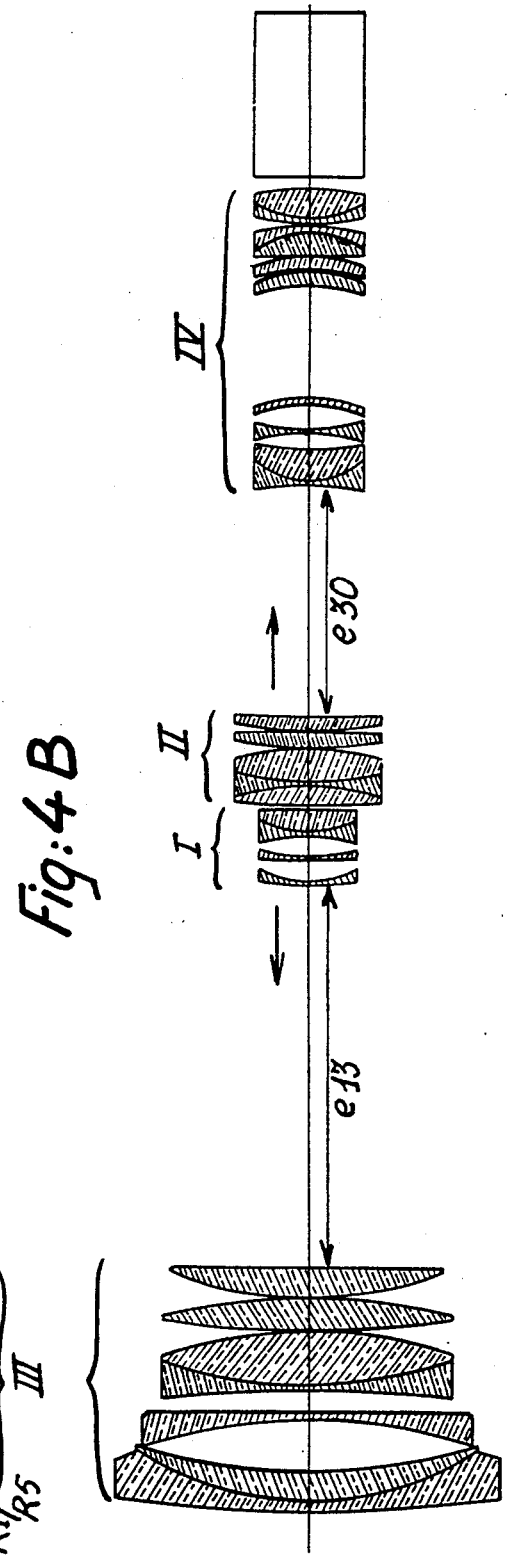

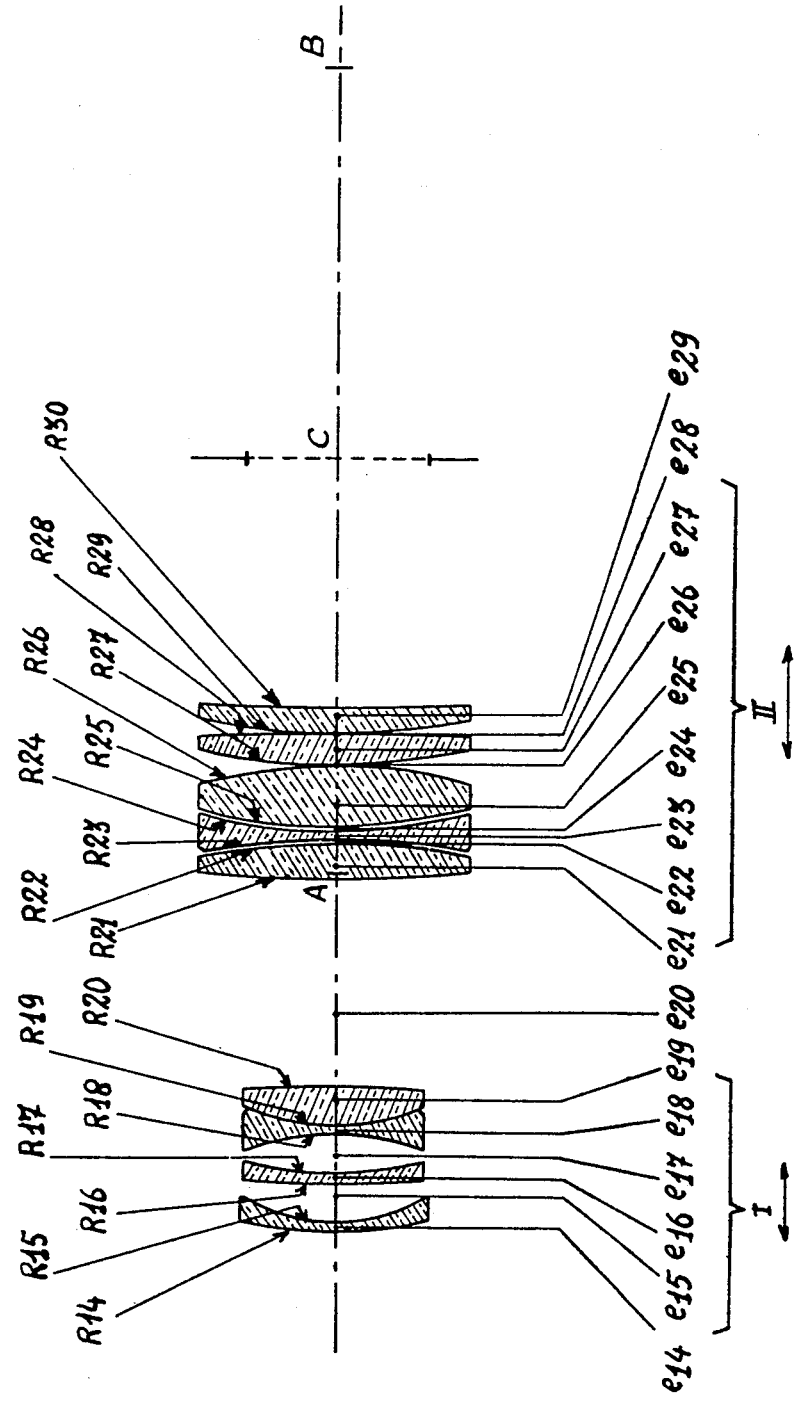

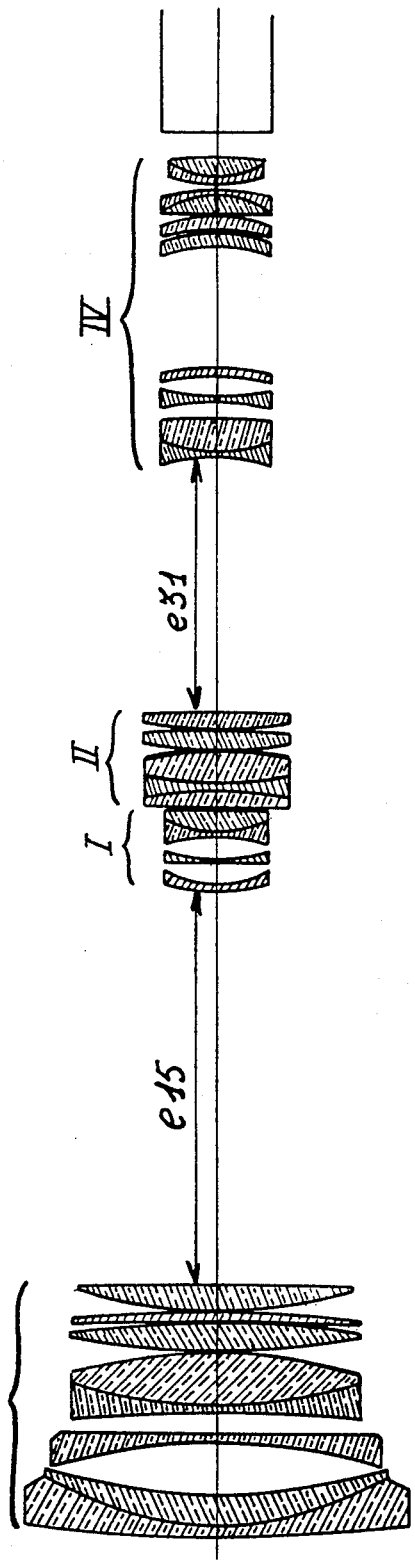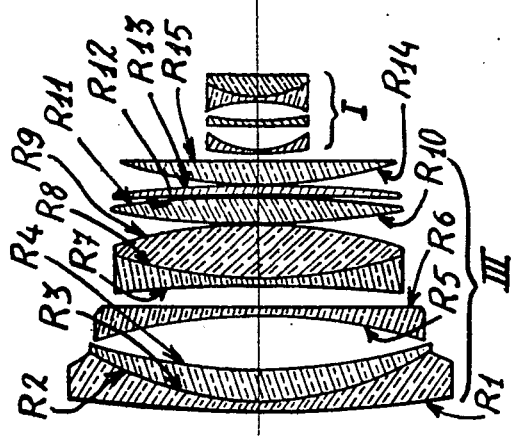

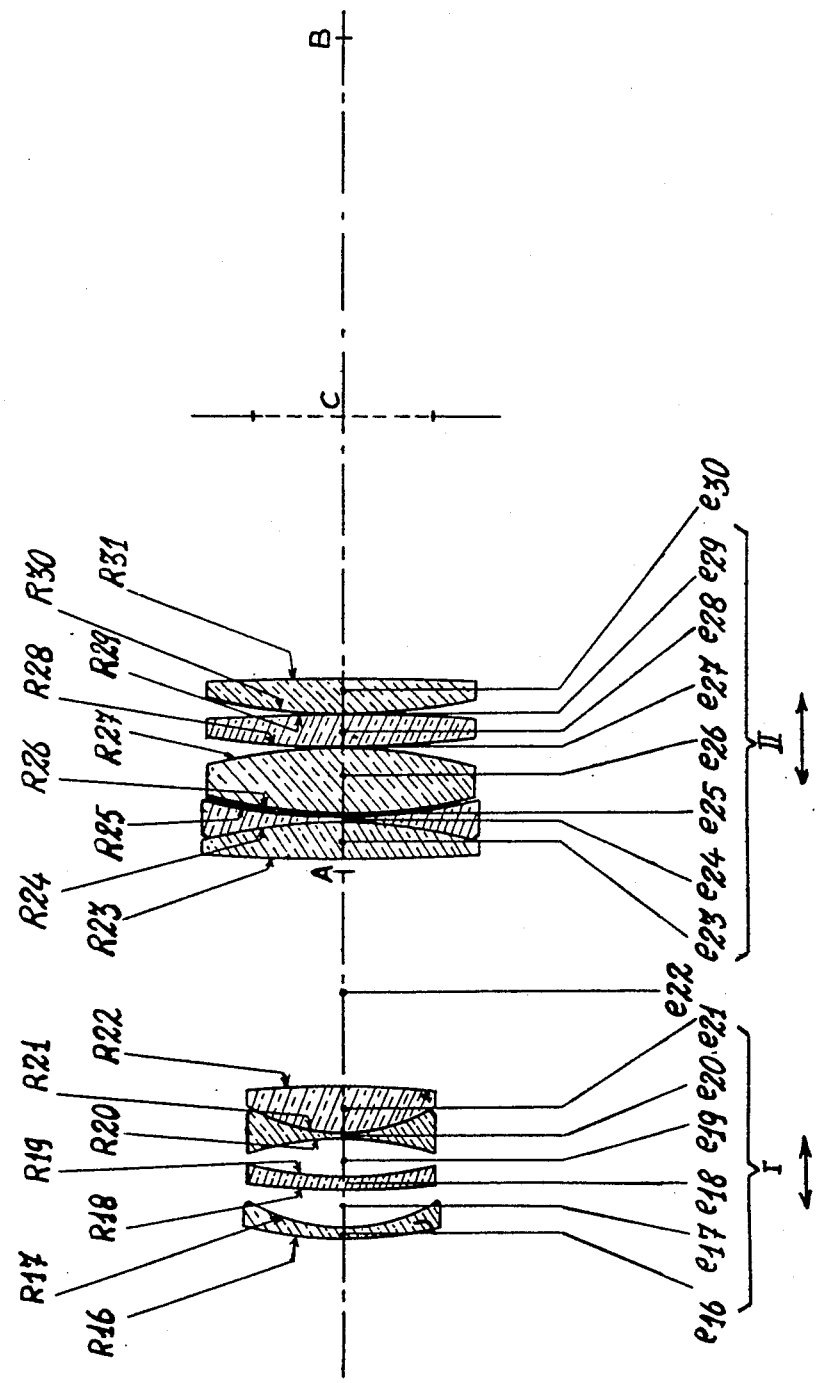

IMAGE ENLARGING OPTICAL VARIATOR

BACKGROUND OF THE INVENTION

The present application is a continuation-in-part of the patent application Ser. No. 856,084 filed on Nov. 30, 1977, which is the continuation-in-part application of the U.S. patent application Ser. No. 730,712 filed on Oct. 8, 1976 and now both abandoned.

FIELD OF THE INVENTION

This invention relates to an image enlarging optical variator adapted to be integrated in a zoom system, and also, as a complement, to a zoom system equipped with this variator. The variator comprises two coaxial components adapted, from a fixed virtual image located behind the front component, to give a fixed real image located behind the rear component, the magnification of this real image varying as a function of the relative position of the two movable components of the variator.

A device of this character is adapted to be disposed coaxially behind a fixed convergent optical element of the zoom, this convergent element originating the virtual image to be converted by the variator according to this invention.

Moreover, the image obtained at the output end of the variator may be taken up by a fixed optical element located behind the variator so as to give a real final image having dimensions consistent with the relative positions of the movable component elements as mentioned hereinabove. The assembly thus formed of two fixed optical elements located on either side of the optical variator causing only by itself the enlargement variation, constitutes a so-called variable focal length or variable focus lens system or objective.

The choice of a variator is of primary importance when it is desired to obtain first-quality images, irrespective of the relative positions of its components. It is obvious that by properly selecting the components of the variator the nature of the fixed elements can be varied to infinity.

DESCRIPTION OF THE PRIOR ART

Various types of optical variators are known in the art. Thus, the U.S. Pat. No. 3,609,005 to Nakamura discloses a zoom lens incorporating an optical variator of which the rear component consists of the following elements: a first positive power meniscus having its concave front surface facing the object, i.e. the other movable component of the variator; two single biconvex elements: a doublet formed with a biconvex lens and a divergent meniscus.

SUMMARY OF THE INVENTION

The variator according to this invention comprises the following combination:

the two components are movable in relation to each other and also to the fixed position of the diaphragm;

the front component is divergent, comprises four lenses, i.e., in the front to rear direction: a first negative power meniscus having its convex surface at the front, a second negative power lens, third and fourth cemented lenses constituting a doublet in which the front lens is biconcave, the rear one being a positive power lens;

and the rear component comprises likewise four lenses of which one is a negative power lens and the others positive power lenses.

the two movable components of the variator have a relative position such that $g1=g2=G=1$, wherein $g1$ designates the magnification of the image which is produced by the front component, $g2$ the magnification of the image formed by the back component, and $G$ the magnification of the image produced by the complete variator.

Therefore, there is necessarily a relative position of the two movable components of the variator in which these components produce simultaneously the "1" magnification, and this constitutes a fundamental optical property of the variator according to this invention.

According to a specific form of embodiment of the present invention, the negative power lens of the rear component is located at the front of this component. Moreover, since $f1$ is in absolute value the focal length of the front component and $f2$ the focal length of the rear component, the $f2/f1$ ratio should be in excess of 1.2.

BRIEF DESCRIPTION OF THE DRAWING

FIG. 1A illustrates a first form of embodiment of the optical variator according to present invention, associated with the two fixed components, namely the front and rear components of a zoom, the two movable components being each shown in their endmost position nearest to the corresponding fixed component;

FIG. 1B is a view similar to FIG. 1A showing the two components of the optical variator of this invention in their end positions opposite that shown in FIG. 1A, in which they are substantially coupled to each other;

FIG. 1C is a fragmentary view showing on a larger scale only the two groups of lenses of the variator of FIGS. 1A and 1B in a relative position intermediate the positions shown in these FIGS., so that $g1=g2=G=1$;

The groups of FIGS. 2A-2C, 3A-3C, 4A-4C, 5A-5C are views similar to FIGS. 1A to 1C, respectively, each group of FIGS. illustrating another form of embodiment of the optical variator and of the fixed components of the zoom objective to which the variator is incorporated.

DESCRIPTION OF THE PREFERRED EMBODIMENTS

The zoom objective illustrated in FIGS. 1A and 1B comprises two movable components I, II constituting the optical variator proper, and two fixed components III-IV located at the front and at the rear, respectively, of said components I and II.

Each component I to IV comprises the following elements numbered from left to right in the Figures, i.e. from the object to the real image given by the lens system;

Movable component I of the variator: a divergent meniscus R9-R10, a divergent lens R11-R12, a doublet R13-R15 consisting of a biconcave divergent lens R13-R14 and a convergent meniscus R14-R15.

Movable component II: a divergent meniscus R16-R17 coupled to a biconvex lens R17-R18, a convergent meniscus R19-R20 and a biconvex lens R21-R22.

Front fixed component III: a divergent lens R1-R2, a biconvex lens R3-R4, a convergent meniscus R5-R6 and a second convergent meniscus R7-R8.

Rear fixed component IV: a doublet R23–R25 similar to the doublet R13–R15, a divergent meniscus R26–R27, a convergent meniscus R28–R29 having its convex surface directed away from the object, and a doublet R30–R32 consisting of a divergent meniscus R30–R31 and of a biconvex lens R31–R32.

In their relative positions shown in FIG. 1A, the components I and II of the variator are in their closest positions to the fixed components III and IV, respectively. In contrast thereto, in the position shown in FIG. 1B, components I and II are as close as possible to each other and the relative positions of the two movable components I and II, which is shown in FIG. 1C, is the position in which g1=g2=G=1.

Outside this specific position, the movements of the two components of the device are responsive to a law such that their relative positions constantly preserve the fixity of the resultant image. In all cases the following conditions should be adhered to:

$$0.20 < g1 < 1.60$$

$$0.25 < g2 < 1.50$$

In FIG. 1C, the reference symbols R9, R10, R11, ... designate the radii of curvature of the lenses constituting the movable components I and II to which the sign + is added when their convex surface is directed to the front and the sign − in the opposite case; reference symbols n9, n11, n13 ... designate the refractive indices concerning each lens for the spectral line e. In this specific form of embodiment, the best results are obtained when the following requirements are met, f1 designating the focal length, bearing the sign −, of the front component:

$$-0.17 < \frac{f1}{R9} < 0.04 \quad -0.17 < \frac{f1}{R16} < 0.06$$

$$-1 < \frac{f1}{R10} < -0.78 \quad -2.7 < \frac{f1}{R17} < 1.4$$

$$0 < \frac{f1}{R11} < 0.21 \quad 0.21 < \frac{f1}{R18} < 0.46$$

$$-0.2 < \frac{f1}{R12} < 0.01 \quad -0.41 < \frac{f1}{R19} < -0.11$$

$$0.24 < \frac{f1}{R13} < 0.52 \quad -0.17 < \frac{f1}{R20} < 0.14$$

$$-0.93 < \frac{f1}{R14} < 0.3 \quad -0.44 < \frac{f1}{R21} < -0.13$$

$$-0.14 < \frac{f1}{R15} < 0.06 \quad -0.05 < \frac{f1}{R22} < 0.25$$

It is also advantageous to comply with the following requirements;

$$1.74 < n9 < 1.84 \quad 1.67 < n16 < 1.77$$
$$1.74 < n11 < 1.84 \quad 1.60 < n17 < 1.70$$
$$1.54 < n13 < 1.64 \quad 1.52 < n19 < 1.62$$
$$1.81 < n14 < 1.91 \quad 1.52 < n21 < 1.62$$

In the form of embodiment illustrated in FIGS. 2A to 2C, the variator and the objective incorporating same have the following composition:

Movable component I of the variator: A first divergent meniscus R9–R10, a divergent lens R11–R12, and a doublet consisting of a divergent biconcave lens R13–R14 and of a convergent meniscus R14–R15 of which the convex surface is directed towards the object.

Movable component II: A divergent lens R16–R17, a biconvex lens R18–R19, a convergent meniscus R20–R21 and a biconvex lens R22–R23.

Front fixed component III: A divergent meniscus R1–R2, a biconvex lens R3–R4 and two convergent meniscus R5–R6 and R7–R8.

Rear fixed component IV: A doublet R24–R26 comprising a divergent lens R24–R25 and a convergent meniscus R25–R26 of which the convex face is directed towards the object, a divergent meniscus R27–R28, a convergent meniscus R29–R30 of which the convex surface is directed away from the object, a doublet R31–R33 comprising a divergent meniscus R31–R32 and a biconvex lens R32–R33.

FIG. 2C illustrates the relative positions of the movable components I and II, in which g1=g2=G=1.

In this exemplary form of embodiment, the best results are obtained when the following requirements are met, f1 designating the focal length, bearing the sign −, of the front component:

$$-0.19 < \frac{f1}{R9} < 0.02 \quad -0.58 < \frac{f1}{R17} < -0.37$$

$$-0.97 < \frac{f1}{R10} < -0.76 \quad -0.58 < \frac{f1}{R18} < -0.34$$

$$-0.01 < \frac{f1}{R11} < 0.2 \quad 0.23 < \frac{f1}{R19} < 0.46$$

$$-0.19 < \frac{f1}{R12} < 0.02 \quad -0.44 < \frac{f1}{R20} < -0.17$$

$$0.25 < \frac{f1}{R13} < 0.53 \quad -0.17 < \frac{f1}{R21} < 0.09$$

$$-0.93 < \frac{f1}{R14} < -0.3 \quad -0.41 < \frac{f1}{R22} < -0.15$$

$$-0.19 < \frac{f1}{R15} < 0.01 \quad -0.02 < \frac{f1}{R23} < 0.29$$

$$-0.1 < \frac{f1}{R16} < 0.1$$

It is also advantageous to adhere to the following requirements:

$$1.74 < n9 < 1.84 \quad 1.73 < n16 < 1.83$$
$$1.74 < n11 < 1.84 \quad 1.62 < n18 < 1.72$$
$$1.54 < n13 < 1.64, \quad 1.59 < n20 < 1.69$$
$$1.81 < n14 < 1.91 \quad 1.59 < n22 < 1.69$$

Tables I and II given hereinafter correspond to FIGS. 1C and 2C, respectively, illustrating two concrete examples of devices meeting the requirements set forth in the foregoing. These Tables, in addition to the radii of curvature and refractive indices, of which the values have already been given hereinabove, display the reference symbols concerning the Abbe numbers $\nu$, $\nu_1$, $\nu_2$, $\nu_3$ ... the reference symbols concerning the axial distances between one dioptre and the next dioptre: e1, e2, e3 ..., reference h1 designating the distance between the last surface of the rear component and the position of diaphragm C, reference h2 designating the distance between the position of this diaphragm C and the position of the virtual initial image A, reference h3 designating the distance between the position of the virtual initial image A and the position of the real image B resulting from the effect produced by the device, said references h1, h2 and h3 bearing the sign + from front to rear and sign − in the opposite case.

TABLE NO. 1

|    | R |        |   |    | E    | n  | ne      | ve    |
|----|---|--------|---|----|------|----|---------|-------|
| R1 |   | ∞      |   |    |      |    |         |       |
| R2 | + | 95.29  | ) | e1 | 1.79 | n1 | 1.81253 | 25.30 |
| R3 | + | 94.35  |   | e2 | 0.64 |    | air     |       |
| R4 | − | 215.52 | ) | e3 | 9.   | n3 | 1.62285 | 60.11 |
| R5 | + | 106.99 |   | e4 | 0.09 |    | air     |       |
|    |   |        | ) | e5 | 5.   | n5 | 1.62286 | 60.11 |
| R6 | + | 313.43 |   |    |      |    |         |       |
| R7 | + | 56.54  |   | e6 | 0.09 |    | air     |       |

TABLE NO. 1-continued

| | R | | E | n | ne | νe |
|---|---|---|---|---|---|---|
| | | ) e7 | 5.70 | n7 | 1.62286 | 60.11 |
| R8 + | 154.21 | | | | | |
| | | e8 | 2.046 | | to | 45.67 |
| R9 + | 244.30 | | | | | |
| | | ) e9 | 1. | n9 | 1.79196 | 47.15 |
| R10 + | 18.40 | | | | | |
| R11 − | 150.65 | e10 | 6.10 | | air | |
| | | ) e11 | 1.40 | n11 | 1.79196 | 47.15 |
| R12 + | 168.41 | | | | | |
| R13 − | 42.39 | e12 | 2.75 | | air | |
| R14 + | 26.77 | ) e13 | 1. | n13 | 1.59129 | 60.9 |
| R15 + | 413.63 | ) e14 | 3.70 | n14 | 1.85504 | 23.64 |
| | | e15 | 68.703 | | to | 0.64 |
| R16 + | 300. | | | | | |
| R17 + | 25.76 | ) e16 | 1.10 | n16 | 1.70448 | 20.9 |
| R18 − | 49.06 | ) e17 | 5.50 | n17 | 1.66024 | 56.9 |
| R19 + | 62.44 | e18 | 0.09 | | air | |
| | | ) e19 | 2.20 | n19 | 1.54398 | 73.1 |
| R21 + | 57.59 | e20 | 0.09 | | air | |
| | | ) e21 | 2.80 | n21 | 1.54396 | 73.1 |
| R22 − | 162.60 | | | | | |
| | | e22 | 3.262 | | to | 27.70 |
| R23 − | 25.55 | | | | | |
| R24 + | 20.50 | ) e23 | 1.60 | n23 | 1.59129 | 60.90 |
| R25 + | 1845.34 | ) e24 | 4.10 | n24 | 1.85504 | 23.64 |
| R26 + | 176.38 | e25 | 4.80 | | air | |
| | | ) e26 | 1. | n26 | 1.85504 | 23.64 |
| R27 + | 28.71 | | | | | |
| R28 − | 266.17 | e27 | 3.20 | | air | |
| | | ) e28 | 3.70 | n28 | 1.62286 | 60.11 |
| R29 − | 21.38 | | | | | |
| R30 + | 70.48 | e29 | 0.10 | | air | |
| R31 + | 14.91 | e30 | 1.30 | n30 | 1.79213 | 25.7 |
| R32 − | 66.58 | ) e31 | 5.60 | n31 | 1.59129 | 60.9 |

The first group of data (R1–R8, e1–e8 . . . ) hereinabove comprises the properties of the fixed front component III. The second group of data (R9–R15, e9–e14, . . . ) relates to the front movable component I. The third group of data (R16–R22, e16–e21 . . . ) relates to the rear movable component II, and the fourth group of data (R23–R32, e23–e31 . . . ) relates to the fixed back component IV, all these components being those shown in FIGS. 1A to 1C.

These components further comprise the following properties:

| | |
|---|---|
| f1 = −16.42 | h2 = −28.98 |
| f2 = 29.11 | h3 = 58.86 |

The variable distances e15 and h1 are given hereinafter for five different settings. Also shown therein are the magnifications g1, g2 and G corresponding to each setting.

| e15 | h1 | g1 | g2 | G |
|---|---|---|---|---|
| 68.70 | 7.72 | 0.29 | 0.39 | 0.1135 |
| 49.65 | 11.08 | 0.41 | 0.50 | 0.2045 |
| 23.49 | 19.36 | 0.73 | 0.79 | 0.5738 |
| 11.18 | 25.54 | 1 | 1 | 1 |
| 0.64 | 32.16 | 1.31 | 1.23 | 1.6122 |

TABLE No. 2

| | R | | E | n | ne | νe |
|---|---|---|---|---|---|---|
| R1 + | 1786. | | | | | |
| | | ) e1 | 1.90 | n1 | 1.81253 | 25.30 |
| R2 + | 97. | | | | | |
| | | e2 | 0.83 | | air | |
| R3 + | 98.85 | | | | | |
| | | ) e3 | 7.20 | n3 | 1.62286 | 60.11 |
| R4 − | 353.02 | | | | | |
| | | e4 | 0.10 | | air | |
| R5 + | 90.79 | | | | | |
| | | ) e5 | 4.90 | n5 | 1.62286 | 60.11 |
| R6 + | 442.09 | | | | | |
| | | e6 | 0.10 | | air | |
| R7 + | 66.65 | | | | | |
| | | ) e7 | 5. | n7 | 1.62286 | 60.11 |
| R8 + | 169.85 | | | | | |
| | | e8 | 1.364 | | to | 48.29 |
| R9 + | 181.06 | | | | | |
| | | ) e9 | 1. | n9 | 1.79196 | 47.15 |
| R10 + | 18.98 | | | | | |
| | | e10 | 6.10 | | air | |
| R11 − | 170.50 | | | | | |
| | | ) e11 | 1. | n11 | 1.79196 | 47.15 |
| R12 + | 183.25 | | | | | |
| | | e12 | 2.75 | | air | |
| R13 − | 42. | | | | | |
| | | ) e13 | 1. | n13 | 1.59129 | 60.9 |
| R14 + | 26.71 | | | | | |
| | | ) e14 | 3.70 | n14 | 1.88504 | 23.64 |
| R15 + | 182.30 | | | | | |
| | | e15 | 68.154 | | | 0.23 |
| R16 | ∞ | | | | | |
| | | ) e16 | 1. | n16 | 1.79213 | 25.69 |
| R17 + | 34.59 | | | | | |
| | | e17 | 0.20 | | air | |
| R18 + | 35.82 | | | | | |
| | | ) e18 | 5.70 | n18 | 1.68092 | 55.27 |
| R19 − | 46.17 | | | | | |
| | | e19 | 0.08 | | air | |
| R20 + | 53.50 | | | | | |
| | | ) e20 | 2.30 | n20 | 1.62529 | 52.87 |
| R21 + | 399.52 | | | | | |
| | | e21 | 0.08 | | air | |
| R22 + | 57.92 | | | | | |
| | | ) e22 | 3.20 | n22 | 1.62529 | 52.87 |
| R23 − | 107.48 | | | | | |
| | | e23 | 3.783 | | to | 24.77 |
| R24 − | 25.90 | | | | | |
| | | ) e24 | 1.60 | n24 | 1.59129 | 60.9 |
| R25 + | 20.28 | | | | | |
| | | ) e25 | 4.10 | n25 | 1.85504 | 23.64 |
| R26 + | 335.34 | | | | | |
| | | e26 | 4.60 | | air | |
| R27 + | 271.50 | | | | | |
| | | ) e27 | 1. | n27 | 1.84294 | 29.97 |
| R28 + | 27.77 | | | | | |
| | | e28 | 3.20 | | air | |
| R29 − | 188.16 | | | | | |
| | | ) e29 | 3.70 | n29 | 1.62286 | 68.11 |
| R30 − | 19.59 | | | | | |
| | | e30 | 0.10 | | air | |
| R31 + | 92.01 | | | | | |
| | | ) e31 | 1.30 | n31 | 1.79213 | 25.69 |
| R32 + | 14.29 | | | | | |
| | | ) e32 | 5.60 | n32 | 1.59129 | 60.9 |
| R33 − | 56.23 | | | | | |

| | |
|---|---|
| f1 = 16.42 | h2 = −23.44 |
| f2 = 26.67 | h3 = 49.69 |

The above Table 2 also shows the four groups of data corresponding to the components of the variator and of the objective illustrated in FIGS. 2A to 2C of the drawings, i.e., in the proper order: the front fixed component III (R1 to R8), the front movable component I (R9 to R15), the rear movable component II (R16 to R23), the rear fixed component IV (R24 to R33).

The variable distances e15 and h1 are shown hereunder for five different settings. Also shown are the magnifications g1, g2 and G corresponding to each setting, respectively.

| e15 | h1 | g1 | g2 | G |
|---|---|---|---|---|
| 68.15 | 7.55 | 0.27 | 0.35 | 0.0940 |
| 48.01 | 10.49 | 0.38 | 0.46 | 0.1724 |
| 21.96 | 17.58 | 0.66 | 0.72 | 0.4810 |
| 6.30 | 24.93 | 1 | 1 | 1 |
| 0.23 | 28.54 | 1.18 | 1.14 | 1.3346 |

FIGS. 3A to 3C illustrate a third form of embodiment of the optical variator of this invention, together with the fixed components of the objective in which it is incorporated.

This objective has the following composition:

Front fixed component III: A divergent meniscus R1-R2, a convergent meniscus R3-R4; a divergent biconcave lens R5-R6; a doublet R7-R9 formed with a biconcave divergent lens R7-R8 and with a biconvex lens R8-R9; a biconvex lens R10-R11 and a biconvex lens R12-R13.

Front movable component I: A divergent meniscus R14-R15 a second divergent meniscus R16-R17, a doublet comprising a divergent biconcave lens R18-R19 and a biconvex lens R19-R20.

Rear movable component II: It comprises five lens instead of four as in the two first forms of embodiment described hereinabove. Among these five lenses, one is a negative power lens and the others are positive power lenses. These lenses are: a triplet R21-R24 consisting of a biconvex lens R21-R22, of a divergent biconcave lens R22-R23 and of a biconvex lens R23-R24 sticked on lens R22-R23; a convergent meniscus R25-R26 and a convergent biconvex lens R27-R28.

Rear fixed component IV: A triplet R29-R32 comprising a divergent biconcave lens R29-R30 sticked on a biconvex lens R30-R31 itself sticked in turn on a divergent meniscus R31-R32; a divergent meniscus R33-R34, a doublet comprising a divergent meniscus R35-R36 sticked on a biconvex lens R36-R37, and finally a doublet comprising a divergent meniscus R38-R39 and a biconvex lens R39-R40.

FIG. 3C illustrates a relative position of the two components of the corresponding device, wherein g1=g2=G=1. Outside this position, the two components of this device move according to a law such that their relative position constantly ensure the fixity of the final image. In all cases, the following requirements should be met for better results:

$$0.15 < g1 < 1.9$$

$$0.20 < g2 < 1.7$$

In FIG. 3C, the reference symbols R14, R15, R16 . . . designate the radii of curvature of the various lenses of the four components, said lenses bearing the sign + when their convex surfaces are directed towards the front and the sign − in the opposite case; reference symbols n14, n16, n18 . . . designate the refractive indices of each lens for the spectral line e. In this specific example, the best results are obtained when the following requirements are met, f1 designating the focal length, bearing the sign −, of the front component:

$$-0.56 < \frac{f1}{R14} < -0.25 \quad -0.84 < \frac{f1}{R22} < 1.26$$

$$-1.17 < \frac{f1}{R15} < -0.86 \quad -1.44 < \frac{f1}{R23} < 0.67$$

-continued $$-0.25 < \frac{f1}{R16} < 0.06 \quad 0.11 < \frac{f1}{R24} < 0.45$$

$$-0.64 < \frac{f1}{R17} < -0.32 \quad -0.39 < \frac{f1}{R25} < -0.06$$

$$0.30 < \frac{f1}{R18} < 0.63 \quad -0.19 < \frac{f1}{R26} < 0.15$$

$$-1.77 < \frac{f1}{R19} < 0.16 \quad -0.38 < \frac{f1}{R27} < -0.04$$

$$-0.20 < \frac{f1}{R20} < 0.09 \quad -0.15 < \frac{f1}{R28} < 0.18$$

$$-0.29 < \frac{f1}{R21} < 0.05$$

It is also advantageous to adhere to the following conditions:

| | |
|---|---|
| 1.70 < n14 < 1.80 | 1.75 < n22 < 1.85 |
| 1.70 < n16 < 1.80 | 1.64 < n23 < 1.74 |
| 1.64 < n18 < 1.74 | 1.64 < n25 < 1.74 |
| 1.75 < n19 < 1.85 | 1.64 < n27 < 1.74 |
| 1.64 < n21 < 1.74 | |

The following Table No.3 corresponds to FIGS. 3A to 3C and illustrates a concrete example of devices meeting the above-mentioned requirements for this specific form of embodiment. This Table No.3, in addition to the radii of curvature R1, . . . and indices n . . . , gives the references concerning the Abbe numbers ν, ν₁, ν₂, ν₃ . . . , the references concerning the axial distances between one dioptre and the next dioptre: e1, e2, e3 . . . , the reference h1 designating the distance between the last surface of the rear component and the position of diaphragm C, reference h2 designating the distance between the position of diaphragm C and the position of the virtual initial image A, reference h3 designating the distance between the position of the virtual image A and the position of the real image B resulting from the effect of the device, reference h1, h2 and h3 bearing the sign + in the front to rear direction and − in the opposite case.

TABLE No. 3

| R | | | E | | n | ne | $\nu_e$ |
|---|---|---|---|---|---|---|---|
| R1 | + | 827.54 | | | | | |
| | | | ) e1 | 3.344 | n1 | 1.6940 | |
| R2 | + | 149.09 | | | | | |
| R3 | + | 144.63 | e2 | 0.202 | | air | |
| | | | ) e3 | 10.115 | n3 | 1.81253 | 25.30 |
| R4 | + | 255.91 | | | | | |
| R5 | − | 219.84 | e4 | 13.697 | | air | |
| | | | ) e5 | 3.13 | n5 | 1.89402 | 54.53 |
| R6 | + | 31315.79 | | | | | |
| R7 | − | 566.67 | e6 | 8.425 | | air | |
| | | | ) e7 | 2.642 | n7 | 1.81253 | 25.30 |
| R8 | + | 183.96 | | | | | |
| | | | ) e8 | 23.443 | n8 | 1.48890 | 70.37 |
| R9 | − | 189.91 | | | | | |
| R10 | + | 405.87 | e9 | 0.202 | | air | |
| | | | ) e10 | 11.721 | n10 | 1.66024 | 56.89 |
| R11 | − | 282.93 | | | | | |
| | | | e11 | 0.107 | | air | |
| R12 | + | 160.57 | | | | | |
| | | | ) e12 | 14.066 | n12 | 1.66024 | 56.89 |
| R13 | − | 1992.03 | | | | | |
| | | | e13 | 12.326 | | to | 149.47 |
| R14 | + | 95.57 | | | | | |
| | | | ) e14 | 2 | | n14 | 1.74794 | 44.55 |
| R15 | + | 37.93 | | | | | |
| | | | e15 | 10 | | air | |
| R16 | + | 421.41 | | | | | |
| | | | ) e16 | 2 | | n16 | 1.74794 | 44.55 |
| R17 | + | 80.24 | | | | | |
| | | | e17 | 9 | | air | |
| R18 | − | 83.81 | | | | | |
| | | | ) e18 | 2 | | n18 | 1.69402 | 54.33 |
| R19 | + | 48.67 | | | | | |

TABLE No. 3-continued

| R | | | E | n | ne | Vₑ |
|---|---|---|---|---|---|---|
| R20 | − | 645.58 | ) e19 | 10 | n19 | 1.81253 | 25.30 |
| R21 | + | 335.59 | e20 | 220.518 | | to | 7.69 |
| R22 | − | 181.29 | ) e21 | 8.33 | n21 | 1.69380 | 53.80 |
| R23 | + | 100.35 | ) e22 | 2.38 | n22 | 1.81253 | 25.30 |
| R24 | − | 137 | ) e23 | 15.47 | n23 | 1.69380 | 53.80 |
| R25 | + | 171.40 | e24 | 0.119 | | air | |
| R26 | + | 2171.53 | ) e25 | 7.14 | n25 | 1.69380 | 53.80 |
| R27 | + | 182.85 | e26 | 0.119 | | air | |
| R28 | − | 2667.09 | ) e27 | 7.735 | n27 | 1.69380 | 53.80 |
| R29 | − | 71.52 | e28 | 11.898 | | to | 87.57 |
| R30 | + | 42.97 | ) e29 | 2.38 | n29 | 1.69402 | 54.53 |
| R31 | − | 230.89 | ) e30 | 17.85 | n30 | 1.81253 | 25.30 |
| R32 | − | 300.35 | ) e31 | 2.38 | n31 | 1.69402 | 54.53 |
| R33 | + | 206.67 | e32 | 12.59 | | air | |
| R34 | + | 96.38 | ) e33 | 2.499 | n33 | 1.61930 | 44.19 |
| R35 | + | 447.20 | e34 | 6.951 | | air | |
| R36 | + | 73.63 | ) e35 | 1.19 | n35 | 1.73436 | 28.17 |
| R37 | − | 72.95 | ) e36 | 10.71 | n36 | 1.46619 | 65.56 |
| R38 | + | 112.18 | e37 | 0.25 | | air | |
| R39 | + | 31.63 | ) e38 | 1.19 | n38 | 1.81253 | 25.30 |
| R40 | − | 57.82 | ) e39 | 14.244 | n39 | 1.46619 | 65.56 | f1 = −38.631    h2 = −90.88
f2 = 78.466    h3 = 183.78

The variable distances e20 and h1 are shown hereinafter for five different settings. Also shown are the magnifications g1, g2 and G corresponding to each setting, respectively.

| e20 | h1 | g1 | g2 | G |
|---|---|---|---|---|
| 220.52 | 4.16 | 0.236 | 0.349 | 0.0825 |
| 138.42 | 18.03 | 0.406 | 0.526 | 0.213 |
| 60.56 | 46.48 | 0.845 | 0.888 | 0.750 |
| 44.70 | 55.24 | 1 | 1 | 1 |
| 7.69 | 79.84 | 1.473 | 1.313 | 1.935 |

FIGS. 4A to 4C illustrate another form of embodiment of the device of this invention, in which the components have the following compositions:

Front movable component I: a divergent meniscus R14-R15, a second divergent meniscus R16-R17, a doublet R18-R20 formed with a biconcave divergent lens R18-R19 and with a convergent lens R19-R20.

Rear movable component II: a biconvex lens R21-R22, a biconcave lens R23-R24, a biconvex lens R25-R26, a biconvex convergent lens R27-R28 and a convergent meniscus R29-R30.

Front fixed component III: a divergent meniscus R1-R2, a convergent meniscus R3-R4, a biconcave divergent lens R5-R6, a doublet OR7-R9 formed with a divergent biconcave lens R7-R8 and with a biconvex lens R8-R9; a biconvex lens R10-R11 and a biconvex lens R12-R13.

Rear fixed component IV: a doublet R31-R33 formed with a biconcave divergent lens R31-R32 and a convergent meniscus R32-R33, a biconcave divergent lens R34-R35 and a convergent meniscus R36-R37 having its convex surfaces directed away from the object; two convergent meniscus R38-R39 and R40-R41 having their convex surfaces directed away from the object, a doublet R42-R44 consisting of a biconvex lens R42-R43 and of a divergent meniscus R43-R44; a doublet consisting of a divergent meniscus R45-R46 of which the convex surfaces are directed towards the object, and of a biconvex lens R46-R47.

In this specific form of embodiment, the best results are obtained when the following requirements are met, f1 designating the focal length, affected by the sign−, of the front component:

$$-0.51 < \frac{f1}{R14} < -0.22 \quad 0.04 < \frac{f1}{R23} < 0.34$$

$$-1.12 < \frac{f1}{R15} < -0.84 \quad -0.44 < \frac{f1}{R24} < -0.14$$

$$-0.23 < \frac{f1}{R16} < 0.05 \quad -0.46 < \frac{f1}{R25} < -0.13$$

$$-0.62 < \frac{f1}{R17} < -0.34 \quad 0.14 < \frac{f1}{R26} < 0.46$$

$$0.31 < \frac{f1}{R18} < 0.62 \quad -0.41 < \frac{f1}{R27} < -0.07$$

$$-1.66 < \frac{f1}{R19} < 0.08 \quad -0.14 < \frac{f1}{R28} < 0.19$$

$$-0.09 < \frac{f1}{R20} < 0.21 \quad -0.41 < \frac{f1}{R29} < -0.07$$

$$-0.28 < \frac{f1}{R21} < 0.05 \quad +0.20 < \frac{f1}{R30} < 0.14$$

$$0.02 < \frac{f1}{R22} < 0.35$$

It is also advantageous to adhere to the following conditions:

$1.70 < n14 < 1.80$  $1.75 < n23 < 1.85$
$1.70 < n16 < 1.80$  $1.59 < n25 < 1.69$
$1.64 < n18 < 1.74$  $1.57 < n27 < 1.67$
$1.75 < n19 < 1.85$  $1.57 < n29 < 1.67$
$1.59 < n21 < 1.69$

The following Table No. 4 corresponds to FIGS. 4A to 4C of the drawings and provides a numerical example of a device meeting the above requirements. The data are determined in the same manner as for the preceding Tables.

TABLE No. 4

| R | | | E | n | ne | γₑ |
|---|---|---|---|---|---|---|
| R1 | + | 626.96 | ) e1 | 3.326 | n1 | 1.69402 | 54.53 |
| R2 | + | 127.78 | e2 | 0.52 | | AIR | |
| R3 | + | 125.31 | ) e3 | 11.954 | n3 | 1.81253 | 25.30 |
| R4 | + | 230.89 | e4 | 21.31 | | AIR | |
| R5 | − | 216.17 | ) e5 | 3.118 | n5 | 1.69402 | 54.53 |
| R6 | + | 8547.01 | e6 | 8.212 | | AIR | |
| R7 | − | 668.45 | ) e7 | 2.599 | n7 | 1.81253 | 25.30 |
| R8 | + | 178.67 | ) e8 | 21.31 | n8 | 1.48890 | 70.37 |
| R9 | − | 195.58 | e9 | 0.208 | | AIR | |
| R10 | + | 411.88 | ) e10 | 13.513 | n10 | 1.84304 | 59.85 |
| R11 | − | 249.25 | | | | | |

TABLE No. 4-continued

| R | | | E | n | ne | $\gamma_e$ |
|---|---|---|---|---|---|---|
| | | e11 | 0.104 | | AIR | |
| R12 | + | 151.01 | | | | |
| | | ) e12 | 12.474 | n12 | 1.64304 | 59.85 |
| R13 | − | 4344.02 | | | | |
| | | e13 | 1.753 | | to | 154.58 |
| R14 | + | 95.10 | | | | |
| | | ) e14 | 1.80 | n14 | 1.74794 | 44.55 |
| R15 | + | 35.49 | | | | |
| | | e15 | 9 | | AIR | |
| R16 | + | 379.22 | | | | |
| | | ) e16 | 1.80 | n16 | 1.74794 | 44.55 |
| R17 | + | 72.22 | | | | |
| | | e17 | 8.10 | | AIR | |
| R18 | − | 74.98 | | | | |
| | | ) e18 | 1.80 | n18 | 1.69402 | 54.53 |
| R19 | + | 43.80 | | | | |
| | | ) e19 | 9 | n19 | 1.81253 | 25.30 |
| R20 | − | 569.80 | | | | |
| | | e20 | 235.032 | | to | 1.08 |
| R21 | + | 300.30 | | | | |
| | | ) e21 | 7.398 | n21 | 1.64304 | 59.85 |
| R22 | − | 183.32 | | | | |
| | | e22 | 0.10 | | AIR | |
| R23 | − | 183.32 | | | | |
| | | ) e23 | 2.17 | n23 | 1.81253 | 25.30 |
| R24 | + | 117.61 | | | | |
| | | e24 | 0.10 | | AIR | |
| R25 | + | 117.61 | | | | |
| | | ) e25 | 13.514 | n25 | 1.64304 | 59.85 |
| R26 | − | 115.22 | | | | |
| | | e26 | 0.099 | | AIR | |
| R27 | + | 146.41 | | | | |
| | | ) e27 | 6.708 | n27 | 1.62286 | 60.11 |
| R28 | − | 1375.52 | | | | |
| | | e28 | 0.099 | | AIR | |
| R29 | + | 142.73 | | | | |
| | | ) e29 | 6.116 | n29 | 1.62286 | 60.11 |
| R30 | + | 1089.56 | | | | |
| | | e30 | 12.60 | | to | 93.73 |
| R31 | − | 230.95 | | | | |
| | | ) e31 | 2.25 | n31 | 1.69233 | 49.35 |
| R32 | + | 31.97 | | | | |
| | | ) e32 | 13.50 | n32 | 1.81253 | 25.30 |
| R33 | + | 196 | | | | |
| | | e33 | 5.625 | | AIR | |
| R34 | − | 86.81 | | | | |
| | | ) e34 | 2.25 | n34 | 1.70448 | 29.88 |
| R35 | + | 155.04 | | | | |
| | | e35 | 8.037 | | AIR | |
| R36 | − | 107.50 | | | | |
| | | ) e36 | 3.60 | n36 | 1.70586 | 40.82 |
| R37 | − | 72.14 | | | | |
| | | e37 | 45 | | AIR | |
| R38 | − | 77.49 | | | | |
| | | ) e38 | 5.692 | n38 | 1.46619 | 65.56 |
| R39 | − | 51.66 | | | | |
| | | e39 | 0.09 | | AIR | |
| R40 | − | 123.30 | | | | |
| | | ) e40 | 5.692 | n40 | 1.46619 | 65.56 |
| R41 | − | 57.44 | | | | |
| | | e41 | 0.09 | | AIR | |
| R42 | − | 2100.84 | | | | |
| | | ) e42 | 9.54 | n42 | 1.46619 | 65.56 |
| R43 | − | 36.05 | | | | |
| | | ) e43 | 1.89 | n43 | 1.73692 | 51.15 |
| R44 | − | 145.50 | | | | |
| | | e44 | 1.125 | | AIR | |
| R45 | + | 79.43 | | | | |
| | | ) e45 | 1.80 | n45 | 1.81253 | 25.30 |
| R46 | + | 41.39 | | | | |
| | | ) e46 | 12.60 | n46 | 1.46619 | 65.56 |
| R47 | − | 157.83 | | | | |
| | | e47 | 5 | | AIR | |
| R48 | | ∞ | | | | |
| | | ) e48 | 65.20 | n48 | 1.51873 | 64.04 |
| R49 | | ∞ | | | | |

$f_1 = -34.77 \qquad h_2 = -90.66$
$f_2 = 73.49 \qquad h_3 = 176.00$

The variable distances e20 and h1 are given hereinafter for five different settings. Also shown are the magnifications g1, g2 and G corresponding to each adjustment, respectively.

| e20 | h1 | g1 | g2 | G |
|---|---|---|---|---|
| 235.03 | 3.66 | 0.200 | 0.312 | 0.0625 |
| 128.56 | 20.35 | 0.414 | 0.539 | 0.223 |
| 75.35 | 38.61 | 0.708 | 0.788 | 0.558 |
| 45.42 | 54.20 | 1 | 1 | 1 |
| 1.08 | 84.79 | 1.654 | 1.416 | 2.343 |

FIGS. 5A to 5C of the drawings illustrate a fifth form of embodiment of the device of this invention, with the following composition:

Front movable component I: a convergent meniscus R16–R17, a divergent meniscus R18–R19, a doublet R20–R22 consisting of a divergent biconcave lens R20–R21 and of a convergent lens R21–R22.

Back movable component II: a doublet comprising a biconvex lens R23–R24, a divergent biconcave lens R24–R25, a biconvex lens R26–R27; a biconvex lens R28–R29 and a biconvex lens R30–R31.

Back fixed component IV: a doublet comprising a divergent biconcave lens R32–R33 and a biconvex lens R33–R34, a divergent biconcave lens R35–R36, a convergent meniscus R37–R38 having its concave surface directed towards the object, then another set of lenses comprising: two convergent meniscus R39–R40 and R41–R42 having their concave surfaces directed towards the object, a doublet comprising a biconvex lens R43–R44 and a divergent meniscus R44–R45, then a doublet consisting of a divergent meniscus R46–R47 of which the convex surface is directed towards the object, and of a biconvex lens R47–R48.

Front fixed component III: the first six elements R1 to R11 are similar to the elements R1 to R11 of the objective of FIGS. 4A to 4C. Then, this component comprises in succession: a convergent meniscus R12–R13, a biconvex lens R14–R15.

For better results with this form of embodiment, the following requirements should be met, f1 designating the focal length, bearing the sign −, of the front component:

$$-0.52 < \frac{f_1}{R16} < -0.23 \qquad -0.40 < \frac{f_1}{R24} < 0.87$$
$$-1.14 < \frac{f_1}{R17} < -0.84 \qquad -0.36 < \frac{f_1}{R25} < -0.10$$
$$-0.23 < \frac{f_1}{R18} < 0.06 \qquad -0.40 < \frac{f_1}{R26} < -0.06$$
$$-0.62 < \frac{f_1}{R19} < -0.32 \qquad 0.12 < \frac{f_1}{R27} < 0.46$$
$$0.31 < \frac{f_1}{R20} < 0.62 \qquad -0.34 < \frac{f_1}{R28} < 0.01$$
$$-1.71 < \frac{f_1}{R21} < 0.09 \qquad -0.09 < \frac{f_1}{R29} < 0.25$$
$$-0.07 < \frac{f_1}{R22} < 0.19 \qquad -0.13 < \frac{f_1}{R31} < 0.22$$

It is also advantageous to adhere to the following conditions:

$1.70 < n16 < 1.80 \qquad 1.75 < n24 < 1.85$
$1.70 < n18 < 1.80 \qquad 1.59 < n26 < 1.69$
$1.64 < n20 < 1.74 \qquad 1.57 < n28 < 1.67$
$1.75 < n21 < 1.85 \qquad 1.57 < n30 < 1.67$
$1.59 < n23 < 1.69$ The following Table No. 5 corresponds to the embodiment of FIGS. 5A to 5C and provides a concrete example of a device meeting the requirements and conditions set forth hereinabove. In this Table, the same data designated by the same reference symbols as in the case of the preceding Tables are found.

TABLE NO 5

| R | | | E | n | ne | e |
|---|---|---|---|---|---|---|
| R1 | + | 650.20 | | | | |
| | | ) e1 | 3.50 | n1 | 1.69402 | 54.53 |
| R2 | + | 132.53 | e2 | 0.50 | | air |
| R3 | + | 129.80 | | | | |
| | | ) e3 | 12.40 | n3 | 1.81253 | 25.30 |
| R4 | + | 234.44 | e4 | 22 | | air |
| R5 | − | 225.33 | | | | |
| | | ) e5 | 3.20 | n5 | 1.69402 | 54.53 |
| R6 | + | 8196.72 | e6 | 8.50 | | air |
| R7 | − | 682.52 | | | | |
| | | ) e7 | 2.70 | n7 | 1.81253 | 25.30 |
| R8 | + | 185.01 | | | | |
| | | ) e8 | 22. | n8 | 1.48890 | 70.37 |
| R9 | − | 202.43 | e9 | 0.20 | | air |
| R10 | + | 328.30 | | | | |
| | | ) e10 | 11.50 | n10 | 1.64304 | 59.85 |
| R11 | − | 384.32 | e11 | 0.10 | | air |
| R12 | − | 2087.68 | | | | |
| | | ) e12 | 4 | n12 | 1.64304 | 59.85 |
| R13 | − | 593.82 | e13 | 0.10 | | air |
| R14 | + | 179.73 | | | | |
| | | ) e14 | 11. | n14 | 1.64304 | 59.85 |
| R15 | − | 2173.91 | e15 | 1.757 | | to 160.95 |
| R16 | + | 96 | | | | |
| | | ) e16 | 1.90 | n16 | 1.74794 | 44.55 |
| R17 | + | 36.39 | e17 | 9.30 | | air |
| R18 | + | 441.65 | | | | |
| | | ) e18 | 1.90 | n18 | 1.74794 | 44.55 |
| R19 | + | 76.47 | e19 | 8.40 | | air |
| R20 | − | 77.73 | | | | |
| | | ) e20 | 1.90 | n20 | 1.69402 | 54.53 |
| R21 | + | 44.44 | | | | |
| | | ) e21 | 9.30 | n21 | 1.81253 | 25.30 |
| R22 | − | 607.90 | e22 | 248.718 | | to 0.93 |
| R23 | + | 1283.70 | | | | |
| | | ) e23 | 7 | n23 | 1.64304 | 59.85 |
| R24 | − | 153.66 | | | | |
| | | ) e24 | 2.40 | n24 | 1.81253 | 25.30 |
| R25 | + | 156.18 | e25 | 0.50 | | air |
| R26 | + | 158.73 | | | | |
| | | ) e26 | 13.50 | n26 | 1.64304 | 59.85 |
| R27 | − | 122.67 | e27 | 0.10 | | air |
| R28 | + | 215.56 | | | | |
| | | ) e28 | 7.30 | n28 | 1.62286 | 60.11 |
| R29 | − | 453.10 | e29 | 0.10 | | air |
| R30 | + | 153 | | | | |
| | | ) e30 | 7.50 | n30 | 1.62286 | 60.11 |
| R31 | − | 781.86 | e31 | 13.10 | | to 101.69 |
| R32 | − | 127.99 | | | | |
| | | ) e32 | 2.40 | n32 | 1.69233 | 49.35 |
| R33 | + | 47.93 | | | | |
| | | ) e33 | 14.40 | n33 | 1.81253 | 25.30 |
| R34 | − | 270.56 | e34 | 6 | | air |
| R35 | − | 126.31 | | | | |
| | | ) e35 | 2.40 | n35 | 1.70448 | 29.88 |
| R36 | + | 123.50 | e36 | 8.50 | | air |
| R37 | − | 90.68 | | | | |
| | | ) e37 | 3.80 | n37 | 1.70586 | 40.82 |
| R38 | − | 67.23 | e38 | 48 | | air |
| R39 | − | 57.79 | | | | |
| | | ) e39 | 6 | n39 | 1.46619 | 65.56 |
| R40 | − | 56.39 | e40 | 0.10 | | air |
| R41 | − | 109.77 | | | | |
| | | ) e41 | 6 | n41 | 1.46619 | 65.56 |
| R42 | − | 62.27 | e42 | 0.10 | | air |
| R43 | + | 963.39 | | | | |
| | | ) e43 | 8 | n43 | 1.46619 | 65.56 |
| R44 | − | 41.37 | | | | |
| | | ) e44 | 2 | n44 | 1.73692 | 51.15 |
| R45 | − | 96.63 | e45 | 3.30 | | air |
| R46 | + | 94.52 | | | | |
| | | ) e46 | 2 | n46 | 1.81253 | 25.30 |
| R47 | + | 31.75 | | | | |
| | | ) e47 | 8 | n47 | 1.46619 | 65.56 |
| R48 | − | 144.91 | e48 | 10 | | air |
| R49 | | ∞ | | | | |
| | | ) e49 | 65.20 | n49 | 1.51873 | 64.04 |

TABLE NO 5-continued

| R | | E | n | ne | e |
|---|---|---|---|---|---|
| R50 | ∞ | | | | | f1 = −36.07    h2 = −98.91
f2 = 79.18     h3 = 194.81

The variable distances e22 and h1 are given hereinafter for five different settings. Also shown are the magnifications g1, g2 and G corresponding to each adjustment, respectively.

| e22 | h1 | g1 | g2 | G |
|---|---|---|---|---|
| 248.72 | 3.00 | 0.200 | 0.319 | 0.0637 |
| 137.00 | 21.13 | 0.416 | 0.548 | 0.228 |
| 80.24 | 41.20 | 0.720 | 0.801 | 0.577 |
| 50.49 | 56.96 | 1 | 1 | 1 |
| 0.93 | 91.59 | 1.706 | 1.437 | 2.453 |

Although the invention has been described with reference to specific and preferred forms of embodiment, it will readily appear to those conversant with the art that many constructional details may be modified without departing from the basic principles of the invention as disclosed in the appended claims.

As already mentioned hereinabove, the device constituting the subject-matter of the present invention is intended for producing the desired variable magnification or enlargement of an image from a fixed convergent optical element disposed in front thereof, another fixed element disposed at the back receiving the magnified image for giving the final image having the desired dimensions. Besides, this invention also includes an assembly thus formed which constitutes a variable focal length objective.

What is claimed as new is:

1. An optical image enlarging variator comprising two coaxial components and adapted, from a fixed virtual image disposed at the rear of the front component, to give a fixed real image located behind the rear component, the magnification varying as a function of the relative position of the two components, wherein:
   said two components are movable in relation to each other and to the fixed position of the diaphragm;
   and the front component, which is divergent, comprises four lenses, namely in the front to rear direction: a first negative power meniscus having its convexity directed towards the front, a second negative power lens, third and fourth lenses cemented to constitute a doublet in which the front lens is biconcave and the rear lens is a positive power lens;
   the rear component comprises four lenses and has at its front end a compound lens, said compound lens including a negative element, and wherein the rear component includes positive lenses located behind said compound lens;
   the two components have a relative position in which g1=g2=G=1 and, irrespective of the relative positions of said components, the following requirements are met:
   $0.20 < g1 < 1.60$ $0.25 < g2 < 1.50$ as well as requirement $f2/f1 < 1.2$, wherein g1 designates the image magnification of the front component, g2 being the image magnification produced by the rear component, G the image magnification produced by the complete device, f1 being in absolute value the focal length of the front component and f2 that of the rear component.

2. Optical variator as claimed in claim 1, wherein the front component meets the following requirements:

$$-0.17 < \frac{f1}{R9} < 0.04$$
$$-1 < \frac{f1}{R10} < -0.78$$
$$0 < \frac{f1}{R11} < 0.21$$
$$-0.2 < \frac{f1}{R12} < 0.01$$
$$0.24 < \frac{f1}{R13} < 0.52$$
$$-0.93 < \frac{f1}{R14} < 0.3$$
$$-0.14 < \frac{f1}{R15} < -0.06$$

wherein f1 designates the focal length, having the minus sign (−), of the front component, R9 and R10 designating the radii of curvature of the front and rear faces of the first lens, respectively, R11 and R12 the radii of curvature of the faces of the second lens, R13 the radius of curvature of the front face of the doublet, R15 the radius of curvature of the rear face of the doublet, R14 the radius of curvature of the doublet cementing face, the minus sign (−) being applied to the radii of curvature of the surfaces of which the convexity is directed to the rear.

3. Optical variator as claimed in claim 2, wherein the front component meets the following requirements:

$$1.74 < n9 < 1.84$$
$$1.74 < n11 < 1.84$$
$$1.54 < n13 < 1.64$$
$$1.81 < n14 < 1.91$$

wherein n9, n11, n13 and n14 designate, in the front to rear direction, the refractive indices of each lens, respectively, for the spectral line e.

4. Optical variator as claimed in claim 2, wherein the rear component consists of a doublet having at the front a negative power lens cemented to a positive power lens, of third and fourth lenses both of the positive power type, located at therear of said doublet, said rear component meeting the following requirements:

$$-0.17 < \frac{f1}{R16} < 0.06$$
$$-2.7 < \frac{f1}{R17} < 1.4$$
$$0.21 < \frac{f1}{R18} < 0.46$$
$$-0.41 < \frac{f1}{R19} < -0.11$$
$$-0.17 < \frac{f1}{R20} < 0.14$$
$$-0.44 < \frac{f1}{R21} < -0.13$$
$$-0.05 < \frac{f1}{R22} < 0.25$$

wherein R16 designates the radius of curvature of the front face of the doublet, R17 the radius of curvature of the cemented face, R18 the radius of curvature of the rear face of said doublet, R19 and R20 designating the radii of curvature of the faces of the third lens, R21 and R22 the radii of curvature of the faces of said fourth lens, the minus sign (−) being applied to the radii of curvature of the surfaces having their convexities directed to the rear.

5. Optical variator as claimed in claim 4, wherein said rear component meets the following requirements:

$$1.67 < n16 < 1.77$$
$$1.60 < n17 < 1.70$$
$$1.52 < n19 < 1.62$$
$$1.52 < n21 < 1.62$$

wherein n16, n17, n19 and n21 designate, in the front to rear direction, the refractive indices of each lens, respectively, for the spectral line e.

6. Optical variator as claimed in claim 1, wherein said front component meets the following requirements:

$$-0.19 < \frac{f1}{R9} < 0.02$$
$$-0.97 < \frac{f1}{R10} < -0.76$$
$$-0.01 < \frac{f1}{R11} < 0.2$$
$$-0.19 < \frac{f1}{R12} < 0.02$$
$$0.25 < \frac{f1}{R13} < 0.53$$
$$-0.93 < \frac{f1}{R14} < -0.3$$
$$-0.19 < \frac{f1}{R15} < 0.01$$

f1 designating the focal length, bearing the minus sign (−), of the front component, R9 and R10 designating the radii of curvature of the front and rear faces of the first lens, respectively, R11 and R12 the radii of curvature of the faces of the second lens, R13 the radius of curvature of the cemented face of said doublet, R14 the radius of curvature of the doublet cementing face, and R15 the radius of curvature of the rear face of said doublet, the minus sign (−) being applied to the radii of curvature of the surfaces having their convexities directed to the rear.

7. Optical variator as claimed in claim 6, wherein said front component meets the following requirements:

$$1.74 < n9 < 1.84$$
$$1.74 < n11 < 1.84$$
$$1.54 < n13 < 1.64$$
$$1.81 < n14 < 1.91$$

n9, n11, n13 and n14 designating, in the front to rear direction, the refractive indices of each lens, respectively, for the spectral line e.

8. Optical variator as claimed in claim 6, wherein said rear component comprises four lenses, the first lens being a negative power lens and the other three positive power lenses, said rear component meeting the following requirements:

$$-0.1 < \frac{f1}{R16} < 0.1 \qquad -0.44 < \frac{f1}{R20} < -0.17$$
$$-0.58 < \frac{f1}{R17} < -0.37 \qquad -0.17 < \frac{f1}{R21} < 0.09$$
$$-0.58 < \frac{f1}{R18} < -0.34 \qquad -0.41 < \frac{f1}{R22} < -0.15$$

-continued $$0.23 < \frac{f_1}{R19} < 0.46 \qquad 0.02 < \frac{f_1}{R23} < 0.29$$

R16 and R17 designating the radii of curvature of the front and rear faces of the first lens, respectively, R18 and R19 the radii of curvature of the faces of the second lens, R20 and R21 designating the radii of curvature of the faces of the third lens, R22 and R23 the radii of curvature of the faces of said fourth lens, the minus sign (−) being applied to the radii of curvature of the surfaces having their convexities directed to the rear.

9. Optical variator according to claim 8, wherein said rear component meets the following requirements:

$$1.73 < n16 < 1.83$$

$$1.62 < n18 < 1.72$$

$$1.59 < n20 < 1.69$$

$$1.59 < n22 < 1.69$$

n16, n18, n20 and n22 designating, in the front to rear direction, the refractive indices of each lens for the spectral line e.

10. An optical image enlarging variator comprising two axial components movable in relation to each other and in relation to the fixed position of the diaphragm, the front component being divergent and comprising four lenses, namely, in the front to rear direction, a first negative power meniscus having its convexity directed to the front, a second negative power lens, third and fourth lenses cemented to each other and constituting a doublet in which the front lens is biconcave and the rear lens is a positive power lens, the rear component comprising five lenses, namely a negative power lens and four positive power lenses, wherein the two components have a relative position in which g1=g2=G=1 and, irrespective of the relative positions of said components, the following requirements are met:

$$0.15 < g1 < 1.9$$

$$0.20 < g2 < 1.7$$

together with the requirement f2/f1 < 1.5, g1 designating the image magnification produced by the front component, g2 the image magnification produced by the rear component, G the image magnification produced by the complete device, f1 denoting in absolute value the focal length of the front component and f2 that of the rear component.

11. Optical variator as claimed in claim 10, wherein the front component meets the following requirements:

$$-0.56 < \frac{f_1}{R14} < -0.25$$

$$-1.17 < \frac{f_1}{R15} < -0.86$$

$$-0.25 < \frac{f_1}{R16} < 0.06$$

$$-0.64 < \frac{f_1}{R17} < -0.32$$

$$0.30 < \frac{f_1}{R18} < 0.63$$

$$-1.77 < \frac{f_1}{R19} < 0.16$$

-continued $$-0.20 < \frac{f_1}{R20} < 0.09$$

f1 designating the focal length bearing the minus sign (−) of said front component, R14 and R15 designating the radii of curvature of the front and rear faces of the first lens, respectively, R16 and R17 designating the radii of curvature of the faces of the second lens, respectively, R18 designating the radius of curvature of the front face of the doublet, R19 designating the radius of curvature of the cemented surface of said doublet, R20 designating the radius of curvature of the rear face of said doublet, the minus sign (−) being applied to the radii of curvature of the surfaces having their convexities directed to the rear.

12. Optical variator as claimed in claim 11, wherein said front component meets the following requirements:

$$1.70 < n14 < 1.80$$

$$1.70 < n16 < 1.80$$

$$1.64 < n18 < 1.74$$

$$1.75 < n19 < 1.85$$

n14, n16, n18 and n19 designating in the front to rear direction the refractive indices of each lens for the spectral line e.

13. Optical variator as claimed in claim 10, wherein the rear component consists of a triplet having at the front a positive power lens cemeted to a negative power lens cemented in turn to a third positive power lens, fourth and fifth lenses, both of the positive power type, located at the rear of said triplet, said rear component meeting the following requirements:

$$-0.29 < \frac{f_1}{R21} < 0.05 \qquad -0.39 < \frac{f_1}{R25} < -0.06$$

$$-0.84 < \frac{f_1}{R22} < 1.26 \qquad <0.19 < \frac{f_1}{R26} < 0.15$$

$$-1.44 < \frac{f_1}{R23} < 0.67 \qquad -0.38 < \frac{f_1}{R27} < -0.04$$

$$0.11 < \frac{f_1}{R24} < 0.45 \qquad -0.15 < \frac{f_1}{R28} < 0.18$$

wherein R21 designates the radius of curvature of the front face of the triplet, R22 being the radius of curvature of the first cemented surface, R23 the radius of curvature of the second cemented surface, R24 the radius of curvature of the rear face of said triplet, R25 and R26 the radii of curvature of the faces of the fourth lens, R27 and R28 the radii of curvature of the faces of the fifth lens, the minus sign (−) being applied to the radii of curvature of the surfaces having their convexities directed to the rear.

14. Optical variator as claimed in claim 13, wherein the rear component meets the following requirements:

$$1.64 < n21 < 1.74$$

$$1.75 < n22 < 1.85$$

$$1.64 < n23 < 1.74$$

$$1.64 < n25 < 1.74$$

$$1.64 < n27 < 1.74$$

n21, n22, n23, n25 and n27 designating in the front to rear direction the refractive indices of each lens, respectively, for the spectral line e.

15. Optical variator as claimed in claim 10 wherein the front component meets the following requirements:

$$-0.57 < \frac{f_1}{R14} < -0.22 \quad 0.31 < \frac{f_1}{R18} < 0.62$$
$$-1.12 < \frac{f_1}{R15} < -0.84 \quad -1.66 < \frac{f_1}{R19} < 0.08$$
$$-0.23 < \frac{f_1}{R16} < 0.05 \quad -0.09 < \frac{f}{R20} < 0.21$$
$$-0.62 < \frac{f_1}{R17} < -0.34$$

f1 designating the focal length, with the minus sign (−), of the front component, R14 and 15 designating the radii of curvature of the front and rear faces, respectively, of the first lens, R16 and R17 the radii of curvature of the faces of the second lens, respectively, R18 the radius of curvature of the front face of the doublet, R19 the radius of curvature of the cemented surface of the doublet, R20 the radius of curvature of the rear face of the doublet, the minus sign (−) being applied to all radii of curvature of the surfaces having their convexities directed to the rear.

16. Optical variator as claimed in claim 15, wherein the front component meets the following requirements:

$1.70 < n14 < 1.80$ $1.70 < n16 < 1.80$ $1.64 < n18 < 1.74$ $1.75 < n19 < 1.85$ n14, n16, n18 and n19 designating, in the front to rear direction, the refractive indices of each lens for the spectral line e.

17. Optical variator as claimed in claim 15, wherein said rear component comprises five lenses, the second lens being of the negative power type and the other four of the positive power type, said rear component meeting the following requirements:

$$-0.28 < \frac{f_1}{R21} < 0.05 \quad -0.44 < \frac{f_1}{R24} < -0.14$$
$$0.02 < \frac{f_1}{R22} < 0.35 \quad -0.46 < \frac{f_1}{R25} < -0.13$$
$$0.04 < \frac{f_1}{R23} < 0.34 \quad 0.14 < \frac{f_1}{R26} < 0.46$$
$$-0.41 < \frac{f_1}{R27} < -0.07 \quad -0.41 < \frac{f_1}{R29} < -0.07$$
$$-0.14 < \frac{f_1}{R28} < 0.19 \quad 0.20 < \frac{f_1}{R30} < 0.14$$

R21 and R22 designating the radii of curvature of the front and rear faces of the first lens, R23 and R24 the radii of curvature of the faces of the second lens, R25 and R26 the radii of curvature of the faces of the third lens, R27 and R28 the radii of curvature of the faces of the fourth lens, R29 and R30 the radii of curvature of the faces of the fifth lens, respectively, the minus sign (−) being applied to the radii of curvature of the lens surfaces having their convexities directed to the rear.

18. Optical variator as claimed in claim 17, wherein the rear component meets the following requirements:

$1.59 < n21 < 1.69$ $1.75 < n23 < 1.85$ $1.59 < n25 < 1.67$ $1.57 < n27 < 1.67$ $1.57 < n29 < 1.67$ n21, n23, n25, n27 and 29 designating in the front to rear direction the refractive indices of each lens, respectively, for the spectral line e.

19. Optical variator as claimed in claim 10, wherein the front component meets the following requirements:

$$-0.52 < \frac{f_1}{R16} < -0.23 \quad -0.23 < \frac{f_1}{R18} < 0.06$$
$$-1.14 < \frac{f_1}{R17} < -0.84 \quad -0.62 < \frac{f_1}{R19} < -0.32$$
$$0.31 < \frac{f}{R20} < 0.62 \quad -0.07 < \frac{f_1}{R22} < 0.19$$
$$-1.71 < \frac{f_1}{R21} < 0.09$$

f1 designating the focal length, bearing the sign minus (−), of the front component, R16 and R17 designating the radii of curvature of the front and rear faces of the first lens, respectively, R18 and R19 the radii of curvature of the faces of the second lens, respectively, R20 the radius of curvature of the front face of the doublet, R21 the radius of curvature of the cemented surface of the doublet, R22 the radius of curvature of the rear surface of the doublet, the minus sign (−) being applied to the radii of curvature of the surfaces having their convexities directed to the rear.

20. Optical variator as claimed in claim 19, wherein the front component meets the following requirements:

$1.70 < n16 < 1.80$ $1.70 < n18 < 1.80$ $1.64 < n20 < 1.74$ $1.75 < n21 < 1.85$ n16, n18, n20 and n21 designating, in the front to rear direction, the refractive indices of each lens for the spectral line e.

21. Optical variator as claimed in claim 19, wherein the rear component comprises a doublet consisting at the front of a positive power lens cemented to a negative power lens, and of third, fourth and fifth lenses all of the positive power type, located at the rear of said doublet, said rear component meeting the following requirements:

$$-0.20 < \frac{-f_1}{R23} < 0.14 \quad -0.34 < \frac{f_1}{R28} < 0.01$$
$$-0.40 < \frac{f_1}{R24} < 0.87 \quad -0.09 < \frac{f_1}{R29} < 0.24$$
$$-0.36 < \frac{-f_1}{R25} < -0.10 \quad -0.41 < \frac{f_1}{R30} < -0.06$$
$$-0.40 < \frac{f_1}{R26} < -0.06 \quad -0.13 < \frac{f_1}{R31} < 0.22$$
$$0.12 < \frac{f_1}{R27} < 0.46$$

R23 designating the radius of curvature of the front face of said doublet, R24 the radius of curvature of the cemented surface, R25 the radius of curvature of the front face of said doublet, R26 and R27 the radii of curvature of the faces of said third lens, R28 and R29 the radii of curvature of the faces of said fourth lens, and R30 and R31 the radii of curvature of the faces of said fifth lens, the minus sign (−) being applied to the radii of curvature of the surfaces having their convexities directed to the rear.

22. Optical variator as claimed in claim 21, wherein the rear component meets the following requirements:

$$1.59 < n23 < 1.69$$

$$1.75 < n24 < 1.85$$

$$1.59 < n26 < 1.69$$

$$1.57 < n28 < 1.67$$

$$1.57 < n30 < 1.67$$

23. An optical variator for use with a fixed diaphragm and adapted for magnifying a fixed virtual image located behind a front component of the variator and producing a magnified fixed real image behind a rear component of the variator, wherein such magnification is variable by varying position of the front and rear components with respect to each other, comprising:

a forwardly and rearwardly movable divergent front component including (a) a first divergent meniscus lens facing convex forwardly and having radii R9 and R10, index of refraction n9 and central thickness e9, (b) a second divergent lens having radii R11 and R12, index of refraction n11 and central thickness e11, (c) a divergent biconcave lens having radii R13 and R14, index of refraction n13 and central thickness e13, and (d) a first convergent meniscus lens having radii R14 and R15, index or refraction n14 and central thickness e14, said lenses in the front component being arranged in an order in which the first divergent meniscus lens is forwardmost in the front component, the second divergent lens is immediately behind the first divergent meniscus lens by a distance of e10, the divergent biconcave lens is immediately behind the second divergent lens by a distance of e12, and the first convergent meniscus lens is immediately behind the divergent biconcave lens and is cemented thereto to form a doublet; and a forwardly and rearwardly movable rear component including (a) a second divergent meniscus lens facing convex forwardly and having radii R16 and R17, index of refraction n16 and central thickness e16, (b) a first biconvex lens having radii R17 and R18, index of refraction n17 and central thickness e17, (c) a second convergent meniscus lens having radii R19 and R20, index of refraction n19 and central thickness e19, and (d) a second biconvex lens having radii R21 and R22, index of refraction n21 and central thickness e21, said lenses in the rear component being arranged in an order in which the second divergent meniscus lens is forwardmost in the rear component, the first biconvex lens is immediately behind the second divergent meniscus lens and is cemented thereto to form a doublet, the second convergent meniscus lens is immediately behind the first biconvex lens by a distance of e18, and the second biconvex lens is located immediately behind the second divergent meniscus lens by a distance of e20;

wherein the front component and the rear component cooperate in a manner that over all forward and rearward travel of the components, g1=g2=G=1, wherein g1 equals image magnification of the front component, g2 equals image magnification of the rear component, and G equals overall magnification of the optical variator and wherein R9, R10, R11, R12, R13, R14, R15, R16, R17, R18, R19, R20, R21, R22, e9, e10, e11, e12, e13, e14, e16, e17, e18, e19, e20, e21, n9, n11, n13, n14, n16, n17, n19, and n21 satisfy the relations shown in the following table, in which Abbe's numbers for the lenses appears, in which positive radii face convex forwardly and negative radii face convex rearwardly, in which e15 is a variable distance between the first convergent meniscus lens and the second divergent meniscus lens caused by forward and rearward travel of the component, and in which all distances between lenses are center-to-center;

| LENS | RADII | DISTANCE/THICKNESS | | INDEX OF REFRACTION | | ABBE'S NUMBER |
|---|---|---|---|---|---|---|
| first divergent meniscus | R9 + 244.30 | e9 | 1 | n9 | 1.79196 | 47.15 |
| | R10 + 18.40 | | | | | |
| | | e10 | 6.10 | | air | |
| second divergent | R11 − 150.65 | e11 | 1.40 | n11 | 1.79196 | 47.15 |
| | R12 + 168.41 | | | | | |
| | | e12 | 2.75 | | air | |
| divergent biconcave | R13 − 42.39 | e13 | 1 | n13 | 1.59129 | 60.9 |
| | R14 + 26.77 | | | | | |
| | | cemented doublet | | | | |
| first convergent meniscus | R14 + 26.77 | e14 | 3.70 | n14 | 1.85504 | 23.64 |
| | R15 + 413.63 | | | | | |
| | | e15 | 68.703−0.64 | | air | |
| second divergent meniscus | R16 + 300 | e16 | 1.10 | n16 | 1.70448 | 29.9 |
| | R17 + 25.76 | | | | | |
| | R17 + 25.76 | cemented doublet | | | | |

-continued

| LENS | RADII | | DISTANCE/THICKNESS | | INDEX OF REFRACTION | | ABBE'S NUMBER |
|---|---|---|---|---|---|---|---|
| first biconvex | | } | e17 | 5.50 | n17 | 1.66024 | 56.9 |
| | R18 − 49.06 | | | | | | |
| | | | e18 | 0.09 | | air | |
| | R19 + 62.44 | } | | | | | |
| second convergent meniscus | | | e19 | 2.20 | n19 | 1.54396 | 73.1 |
| | R20 + 1152.23 | | | | | | |
| | | | e20 | 0.09 | | air | |
| | R21 + 57.59 | } | | | | | |
| second biconvex | | | e21 | 2.80 | n21 | 1.54396 | 73.1 |
| | R22 − 162.60 | | | | | | |

24. An optical variator for use with a fixed diaphragm and adapted for magnifying a fixed virtual image located behind a front component of the variator and producing a magnified fixed real image behind a rear component of the variator, wherein such magnification is variable by varying position of the front and rear components with respect to each other, comprising:
  a forwardly and rearwardly movable divergent front component including (a) a divergent meniscus lens facing convex forwardly and having radii R9 and R10, index of refraction n9 and central thickness e9, (b) a first divergent lens having radii R11 and R12, index of refraction n11 and central thickness e11, (c) a divergent biconcave lens having radii R13 and R14, index of refraction n13 and central thickness e13, and (d) a first convergent meniscus lens having radii R14 and R15, index of refraction n14 and central thickness e14, said lenses in the front component being arranged in an order in which the divergent meniscus lens is forwardmost in the front component, the first divergent lens is immediately behind the divergent meniscus lens by a distance of e10, the divergent biconcave lens is immediately behind the first divergent lens by a distance of e12, and the first convergent meniscus lens is immediately behind the divergent biconcave lens and is cemented thereto to form a doublet; and
  a forwardly and rearwardly movable rear component including (a) a second divergent lens facing convex forwardly and having radii R16 and R17, index of refraction n16 and central thickness e16, (b) a first biconvex lens having radii R18 and R19, index of refraction n18 and central thickness e18, (c) a second convergent meniscus lens having radii R20 and R21, index of refraction n20 and central thickness e20, (d) a second biconvex lens having radii R22 and R23, index of refraction n22 and central thickness e22, said lenses in the rear component being arranged in an order in which the second divergent lens is forwardmost in the rear component, the first biconvex lens is immediately behind the second divergent lens by a distance of e17, the second convergent meniscus lens is immediately behind the first biconvex lens by a distance of e19, and the second biconvex lens is located immediately behind the second convergent meniscus lens by a distance of e21;
  wherein the front component and the rear component cooperate in a manner that over all forward and rearward travel of the components, g1=g2=G=1, wherein g1 equals image magnification of the front component, g2 equals image magnification of the rear component, and G equals overall magnification of the optical variator
  and wherein R9, R10, R11, R12, R13, R14, R15, R16, R17, R18, R19, R20, R21, R22, R23, e9, e10, e11, e12, e14, e16, e17, e18, e19, e20, e21, e22, n9, n11, n13, n14, n16, n18, n20, and n22 satisfy the relations shown in the following table, in which Abbe's numbers for the lenses appears, in which positive radii face convex forwardly and negative radii face convex rearwardly, in which e15 is a variable distance between the first convergent meniscus lens and the second divergent lens caused by forward and rearward travel of the components and in which all distances between lenses are center-to-center;

| LENS | RADII | | DISTANCE/THICKNESS | | INDEX OF REFRACTION | | ABBE'S NUMBER |
|---|---|---|---|---|---|---|---|
| divergent meniscus | R9  + 181.06 | } | e9 | 1 | n9 | 1.79196 | 47.15 |
| | R10 + 18.98 | | | | | | |
| | | | e10 | 6.10 | | air | |
| first divergent | R11 − 170.50 | } | e11 | 1 | n11 | 1.79196 | 47.15 |
| | R12 + 183.25 | | | | | | |
| | | | e12 | 2.75 | | air | |
| divergent biconcave | R13 − 42 | } | e13 | 1 | n13 | 1.59129 | 60.9 |
| | R14 + 26.71 | | } cemented doublet | | | | |
| first convergent meniscus | R14 + 26.71 | } | e14 | 3.70 | n14 | 1.85504 | 23.64 |
| | R15 + 182.30 | | | | | | |
| | | | e15 | 68.154−0.23 | | air | |
| second divergent | R16  ∞ | } | e16 | 1 | n16 | 1.79213 | 25.69 |
| | R17 + 34.59 | | | | | | |

-continued

| LENS | | RADII | | DISTANCE/THICKNESS | | INDEX OF REFRACTION | ABBE'S NUMBER |
|---|---|---|---|---|---|---|---|
| first biconvex | R18 | + | 35.82 | e17 | 0.20 | air | |
| | R19 | − | 45.17 | e18 | 5.70 | n18 1.68092 | 55.27 |
| second convergent meniscus | R20 | + | 53.50 | e19 | 0.08 | air | |
| | | | | e20 | 2.30 | n20 1.62529 | 52.87 |
| | R21 | + | 399.52 | | | | |
| second biconvex | R22 | + | 57.92 | e21 | 0.08 | air | |
| | R23 | − | 107.48 | e22 | 3.20 | n22 1.62529 | 52.87 |

25. An optical variator for use with a fixed diaphragm and adapted for magnifying a fixed virtual image located behind a front component of the variator and producing a magnified fixed real image behind a rear component of the variator, wherein such magnification is variable by varying position of the front and rear components with respect to each other, comprising:

a forwardly and rearwardly movable divergent front component including (a) a first divergent meniscus lens facing convex forwardly and having radii R14 and R15, index of refraction n14 and a central thickness e14, (b) a second divergent meniscus lens having radii R16 and R17, index of refraction n16 and central thickness e16, (c) a first divergent biconcave lens having radii R18 and R19, index of refraction n18 and central thickness e18, and (d) a first biconvex lens having radii R19 and R20, index of refraction n19 and central thickness e19, said lenses in the front component being arranged in an order in which the first divergent meniscus lens is forwardmost in the front component, the second divergent meniscus lens is immediately behind the first divergent meniscus lens by a distance of e15, the first divergent biconcave lens is immediately behind the second divergent meniscus lens by a distance of e17, and the first biconvex lens is immediately behind the first divergent biconcave lens and is cemented thereto to form a doublet; and a forwardly and rearwardly movable rear component including (a) a second biconvex lens having radii R21 and R22, index of refraction n21 and central thickness e21, (b) a second divergent biconcave lens having radii R22 and R23, index of refraction n22 and central thickness e22, (c) a third biconvex lens having radii R23 and R24, index of refraction n23 and central thickness e23, (d) a convergent meniscus lens having radii R25 and R26, index of refraction n25 and central thickness e25, and (e) a convergent biconvex lens having radii R27 and R28, index of refraction n27 and central thickness e27, said lenses in the rear component being arranged in an order in which the second biconvex lens is forwardmost in the rear component, the second divergent biconcave lens is immediately behind the second biconvex lens and is cemented thereto to form a part of a triplet, the third biconvex lens is immediately behind the second divergent biconcave lens and is cemented thereto to complete said triplet, the convergent meniscus lens is located immediately behind the third biconvex lens by a distance of e24, and the convergent biconvex lens is located immediately behind the convergent meniscus lens by a distance of e26;

wherein the front component and the rear component cooperate in a manner that over all forward and rearward travel of the components, $g1=g2=G=1$, wherein g1 equals image magnification of the front component, g2 equals image magnification of the rear component, and G equals overall magnification of the optical variator and wherein R14, R15, R16, R17, R18, R19, R20, R21, R22, R23, R24, R25, R26, R27, R28, e14, e15, e16, e17, e18, e19, e21, e22, e23, e24, e25, e26, e27, n14, n16, n18, n19, n21, n22, n23, n25, and n27 satisfy the relations shown in the following table, in which Abbe's numbers for the lenses appears, in which positive radii face convex forwardly and negative radii face convex rearwardly, in which e20 is a variable distance between the first biconvex lens and the second biconvex lens caused by forward and rearward travel of the components, and which all distances between lenses are center-to-center;

| LENS | RADII | DISTANCE/THICKNESS | | INDEX OF REFRACTION | ABBE'S NUMBER |
|---|---|---|---|---|---|
| first divergent meniscus | R14 + 95.57 | e14 | 2 | n14 1.74794 | 44.55 |
| | R15 + 37.93 | | | | |
| | | e15 | 10.00 | air | |
| second divergent meniscus | R16 + 421.41 | e16 | 2 | n16 1.74794 | 44.55 |
| | R17 + 80.24 | | | | |
| | | e17 | 9 | air | |
| first divergent biconcave | R18 − 83.31 | e18 | 2 | n18 1.69402 | 54.53 |
| | R19 + 48.67 | | | | |
| | | cemented doublet | | | |

-continued

| LENS | RADII | | DISTANCE/THICKNESS | INDEX OF REFRACTION | ABBE'S NUMBER |
|---|---|---|---|---|---|
| first biconvex | R19 + 48.67 | } | e19  10 | n19  1.81253 | 25.30 |
|  | R20 − 645.58 |  | e20  220.518–7.69 | air |  |
| second biconvex | R21 + 335.59 | } | e21  8.33 | n21  1.69380 | 53.80 |
|  | R22 − 181.29 | } in cemented triplet | | | |
| second divergent biconcave | R22 − 181.29 | } | e22  2.38 | n22  1.81253 | 25.30 |
|  | R23 + 100.35 | } in cemented triplet | | | |
| third biconvex | R23 + 100.35 | } | e23  15.47 | n23  1.69380 | 53.80 |
|  | R24 − 137 |  | e24  0.119 | air |  |
| convergent meniscus | R25 + 171.40 | } | e25  7.14 | n25  1.69380 | 53.80 |
|  | R26 + 2171.53 |  | e26  0.119 | air |  |
| convergent biconvex | R27 + 182.85 | } | e27  7.735 | n27  1.69380 | 53.80 |
|  | R28 − 2667.0 |  | | | |

26. An optical variator for use with a fixed diaphragm and adapted for magnifying a fixed virtual image located behind a front component of the variator and producing a magnified fixed real image behind a rear component of the variator, wherein such magnification is variable by varying position of the front and rear components with respect to each other, comprising:

a forwardly and rearwardly movable divergent front component including (a) a first divergent meniscus lens facing convex forwardly and having radii R14 and R15, index of refraction n14 and central thickness e14, (b) a second divergent meniscus lens having radii R16 and R17, index of refraction n16 and central thickness 16, (c) a divergent biconcave lens having radii R18 and R19, index of refraction n18 and central thickness e18, and (d) a first convergent lens having radii R19 and R20, index of refraction n19 and central thickness e19, said lenses in the front component being arranged in an order in which the first divergent meniscus lens is forwardmost in the front component, the second divergent meniscus lens is immediately behind the first divergent meniscus lens by a distance of e15, the divergent biconcave lens is immediately behind the second divergent meniscus lens by a distance of e17, and the first convergent lens is immediately behind the divergent biconcave lens and is cemented thereto to form a doublet; and a forwardly and rearwardly movable rear component including (a) a first biconvex lens having radii R21 and R22, index of refraction n21 and central thickness e21, (b) a biconcave lens having radii R23 and R24, index of refraction n23 and central thickness e23, (c) a second biconvex lens having radii R25 and R26, index of refraction n25 and central thickness e25, (d) a convergent biconvex lens having radii R27 and R28, index of refraction n27 and central thickness e27, and (e) a convergent meniscus lens having radii R29 and R30, index of refraction n29 and central thickness e29, said lenses in the rear component being arranged in an order in which the first biconvex lens is forwardmost in the rear component, the biconcave lens is immediately behind the first biconvex lens by a distance of e22, the second biconvex lens is immediately behind the biconcave lens by a distance of e24, the convergent biconvex lens is located immediately behind the second biconvex lens by a distance of e26, and the convergent meniscus lens is immediately behind the convergent biconvex lens by a distance of e28;

wherein the front component and the rear component cooperate in a manner that over all forward and rearward travel of the components, $g1=g2=G=1$, wherein g1 equals image magnification of the front component, g2 equals image magnification of the rear component, and G equals overall magnification of the optical variator and wherein R14, R15, R16, R17, R18, R19, R20 R21, R22, R23, R24, R25, R26, R27, R28, R29, R30, e14, e15, e16, e17, e18, e19, e21, e22, e23, e24, e25, e26, e27, e28, e29, n14, n16, n18, n19, n21, n23, n25, n27, and n29 satisfy the relations shown in the following table, in which Abbe's numbers for the lenses appears, in which positive radii face convex forwardly and negative radii face convex rearwardly, in which e20 is a variable distance between the first convergent lens and the first biconvex lens caused by forward and rearward travel of the components, and in which all distances between lenses are center-to-center;

| LENS | RADII | | DISTANCE/THICKNESS | INDEX OF REFRACTION | ABBE'S NUMBER |
|---|---|---|---|---|---|
| first divergent meniscus | R14 + 95.10 | } | e14  1.80 | n14  1.74794 | 44.55 |
|  | R15 + 35.49 |  | | | |

-continued

| LENS | RADII | | DISTANCE/THICKNESS | | INDEX OF REFRACTION | | ABBE'S NUMBER |
|---|---|---|---|---|---|---|---|
| second divergent meniscus | R16 | + 379.22 | e15 | 9 | | air | |
| | | | e16 | 1.80 | n16 | 1.74794 | 44.55 |
| | R17 | + 72.22 | | | | | |
| | | | e17 | 8.10 | | air | |
| divergent biconcave | R18 | − 74.98 | e18 | 1.80 | n18 | 1.69402 | 54.53 |
| | R19 | + 43.80 | | | | | |
| | | | | cemented doublet | | | |
| first convergent | R19 | + 43.80 | e19 | 9 | n19 | 1.81253 | 25.30 |
| | R20 | − 569.80 | | | | | |
| | | | e20 | 235.032−1.08 | | air | |
| first biconvex | R21 | + 300.30 | e21 | 7.398 | n21 | 1.64304 | 59.85 |
| | R22 | − 183.32 | | | | | |
| | | | e22 | 0.10 | | air | |
| biconcave | R23 | − 183.32 | e23 | 2.17 | n23 | 1.81253 | 25.30 |
| | R24 | + 117.61 | | | | | |
| | | | e24 | 0.10 | | air | |
| second biconvex | R25 | + 117.61 | e25 | 13.514 | n25 | 1.64304 | 59.85 |
| | R26 | − 115.22 | | | | | |
| | | | e26 | 0.099 | | air | |
| convergent biconvex | R27 | + 146.41 | e27 | 6.008 | n27 | 1.62286 | 60.11 |
| | R28 | − 1375.52 | | | | | |
| | | | e28 | 0.099 | | | |
| convergent meniscus | R29 | + 142.73 | e29 | 6.116 | n29 | 1.62286 | 60.11 |
| | R30 | + 1089.56 | | | | | |

27. An optical variator for use with a fixed diaphragm and adapted for magnifying a fixed virtual image located behind a front component of the variator and producing a magnified fixed real image behind a rear component of the variator, wherein such magnification is variable by varying position of the front and rear components with respect to each other, comprising:

a forwardly and rearwardly movable divergent front component including (a) a convergent meniscus lens facing convex forwardly and having radii R16 and R17, index of refraction n16 and central thickness e16, (b) a divergent meniscus lens having radii R18 and R19, index of refraction n18 and central thickness e18, (c) a first divergent biconcave lens having radii R20 and R21, index of refraction n20 and central thickness e20, and (d) a convergent lens having radii R21 and R22, index of refraction n21 and central thickness e21, said lenses in the front component being arranged in an order in which the convergent meniscus lens is forwardmost in the front component, the divergent meniscus lens is immediately behind the first divergent meniscus lens by a distance of e17, the first divergent biconcave lens is immediately behind the divergent meniscus lens by a distance of e19, and the convergent lens is immediately behind the first divergent biconcave lens and is cemented thereto to form a doublet; and a forwardly and rearwardly movable rear component including (a) a first biconvex lens and having radii R23 and R24, index of refraction n23 and central thickness e23, (b) a second divergent biconcave lens having radii R24 and R25, index of refraction n24 and central thickness e24, (c) a second biconvex lens having radii R26 and R27, index of refraction n26, and central thickness e26, (d) a third biconvex lens having radii R28 and R29, index of refraction n28 and central thickness e28, and (e) a fourth biconvex lens having radii R30 and R31, index of refraction n30 and central thickness e30, said lenses in the rear component being arranged in an order in which the first biconvex lens is forwardmost in the rear component, the second divergent biconcave lens is immediately behind the first biconvex lens and is cemented thereto to form a doublet, the second biconvex lens is immediately behind second divergent biconcave lens by a distance of e25, the third biconvex lens is located immediately behind the second biconvex lens by a distance of e27, and the fourth biconvex lens is located immediately behind the third biconvex lens at a distance of e29;

wherein the front component and the rear component cooperate in a manner that over all forward and rearward travel of the components, $g1=g2=G=1$, wherein g1 equals image magnification of the front component, g2 equals image magnification of the rear component, and G equals overall magnification of the optical variator and wherein R16, R17, R18, R19, R20, R21, R22, R23, R24, R25, R26, R27, R28, R29, R30, R31, e16, e17, e18, e19, e20, e21, e23, e24, e25, e26, e27, e28, e29, e30, n16, n18, n20, n21, n23, n24, n26, n28, and n30 satisfy the relations shown in the following table, in which Abbe's numbers for the lenses appears, in which positive radii face convex forwardly and negative radii face convex rearwardly, in which e22 is a variable distance between the convergent lens and the first biconvex lens caused by forward and rearward travel of the components and in which all distances between lenses are center-to-center;

| LENS | RADII | DISTANCE/ THICKNESS | | INDEX OF REFRACTION | | ABBE'S NUMBER |
|---|---|---|---|---|---|---|
| convergent meniscus | R16 + 96.00 | e16 | 1.90 | n16 | 1.74794 | 44.55 |
| | R17 + 36.39 | e17 | 9.30 | | air | |
| divergent meniscus | R18 + 441.05 | e18 | 1.90 | n18 | 1.74794 | 44.55 |
| | R19 + 76.47 | e19 | 8.40 | | air | |
| first divergent meniscus | R20 − 77.73 | e20 | 1.90 | n20 | 1.69402 | 54.53 |
| | R21 + 44.44 | } cemented doublet | | | | |
| convergent | R21 + 44.44 | e21 | 9.30 | n21 | 1.81253 | 25.30 |
| | R22 − 607.90 | e22 | 248.718−0.93 | | air | |
| first biconvex | R23 + 1283.70 | e23 | 7 | n23 | 1.64304 | 59.85 |
| | R24 − 153.66 | } cemented doublet | | | | |
| second divergent biconcave | | | 2.40 | n24 | 1.81253 | 25.30 |
| | R25 + 156.18 | e25 | 0.50 | | air | |
| second biconvex | R26 + 158.73 | e26 | 13.50 | n26 | 1.64304 | 59.85 |
| | R27 − 122.67 | e27 | 0.10 | | air | |
| third biconvex | R28 + 215.56 | e28 | 7.30 | n28 | 1.62286 | 60.11 |
| | R29 − 453.10 | e29 | 0.10 | | air | |
| fourth biconvex | R30 + 153 | e30 | 7.50 | n30 | 1.62286 | 60.11 |
| | R31 − 781.86 | | | | | |

* * * * *